United States Patent [19]

Otsuka et al.

[11] Patent Number: 4,821,526
[45] Date of Patent: Apr. 18, 1989

[54] AIR CONDITIONING APPARATUS

[75] Inventors: Nobuo Otsuka; Hideo Igarashi; Peter Thompson, all of Kamakura, Japan

[73] Assignee: Mitsubishi Denki Kabushiki Kaisha, Tokyo, Japan

[21] Appl. No.: 154,233

[22] Filed: Feb. 10, 1988

Related U.S. Application Data

[62] Division of Ser. No. 899,327, Aug. 22, 1986, Pat. No. 4,754,919.

[30] Foreign Application Priority Data

| Aug. 22, 1985 | [JP] | Japan | 60-186242 |
| Sep. 11, 1985 | [JP] | Japan | 60-201001 |
| Sep. 11, 1985 | [JP] | Japan | 60-201002 |
| Sep. 18, 1985 | [JP] | Japan | 60-208001 |
| Sep. 18, 1985 | [JP] | Japan | 60-208002 |
| Oct. 7, 1985 | [JP] | Japan | 60-225051 |
| Oct. 7, 1985 | [JP] | Japan | 60-225052 |
| Oct. 7, 1985 | [JP] | Japan | 60-225054 |
| Oct. 7, 1985 | [JP] | Japan | 60-225055 |

[51] Int. Cl.[4] .................................... F25D 17/00
[52] U.S. Cl. ................................. 62/180; 165/22; 236/49.5
[58] Field of Search ............ 236/49 D; 165/22; 62/229, 180; 98/1, 5

[56] References Cited

U.S. PATENT DOCUMENTS

| 3,567,115 | 12/1970 | Nelson | 165/22 X |
| 3,780,941 | 12/1973 | Blackwell | 236/49 |
| 3,814,173 | 6/1974 | Coon | 165/22 X |
| 4,347,712 | 9/1982 | Benton et al. | 62/175 |
| 4,530,395 | 7/1985 | Parker et al. | 236/49 D |
| 4,533,080 | 8/1985 | Clark et al. | 165/22 X |

FOREIGN PATENT DOCUMENTS

| 55-14979 | 4/1980 | Japan . |
| 56-35694 | 8/1981 | Japan . |
| 57-179525 | 11/1982 | Japan . |
| 59-32732 | 2/1984 | Japan . |
| 60-60446 | 8/1985 | Japan . |
| 60-47497 | 10/1985 | Japan . |

*Primary Examiner*—William E. Wayner
*Attorney, Agent, or Firm*—Oblon, Fisher, Spivak, McClelland & Maier

[57] ABSTRACT

The air conditioning apparatus comprises a heat source apparatus, an air blower, a damper disposed in each of branch duct to regulate warm air or cool air to be supplied to each of rooms, a room thermostat placed in each of the rooms, a heat load measuring means and a damper control means. The heat load measuring means controls the degree of opening of the dampers through the damper control means on the basis of output signals of an established temperature and the current room temperature from the room thermostats. Further, the capacity of the heat source apparatus and the capacity of the air blower are determined in accordance with the value of the heat load, and the pressure and the temperature of the air in the air duct.

10 Claims, 26 Drawing Sheets

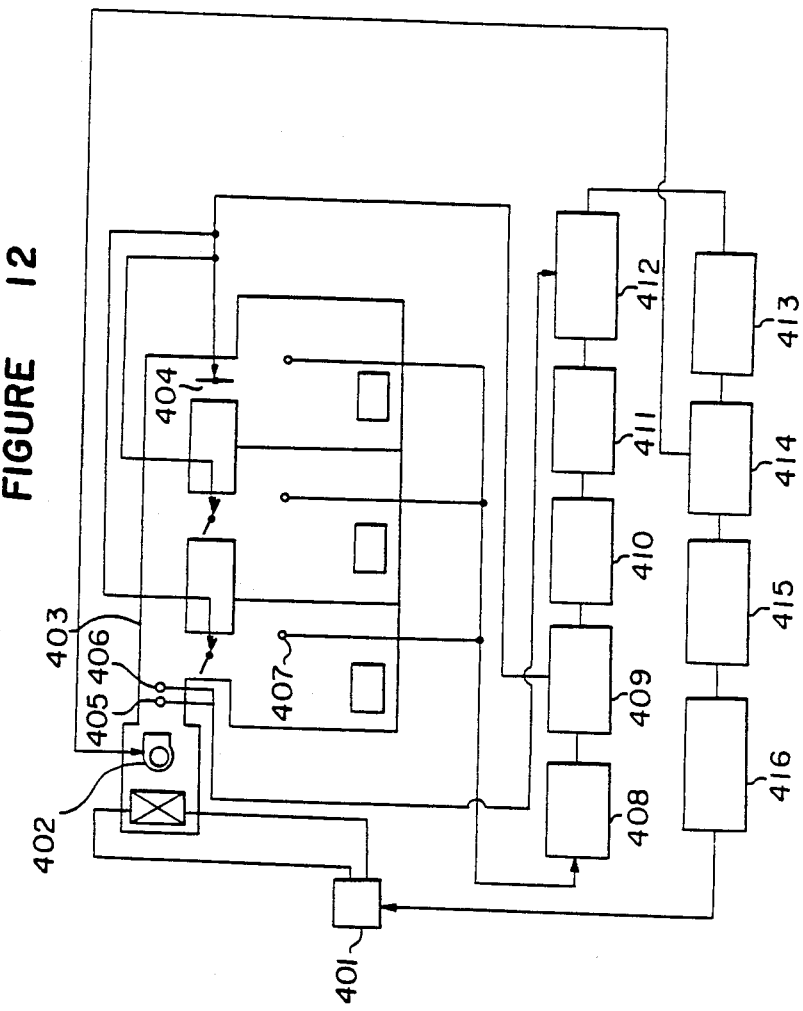

AIR CONDITIONING APPARATUS

This is a division of application Ser. No. 899,327, filed Aug. 22, 1986 now U.S. Pat. No. 4,754,919.

BACKGROUND OF THE INVENTION

This invention relates to a duct type air conditioning apparatus which has adopted a variable air quantity control system capable of regulating temperature in each room independently of the other.

The central air-conditioning system of a type which carries out air-conditioning by distribution of temperature-regulated air to every room through air ducts possesses various meritorious effects in comparison with the conventional heat pump chiller/fan coil system, the package air-conditioners decentralized arrangement system, and others in that it can easily incorporate therein various facilities like a humidifier, a high performance air filter for cleaning external air introduced into the system, and a total heat-exchanger, hence it is able to perform a high grade air conditioning operation, it has the least losses disorder in its heat transporting system, and yet it can utilize the room space with high effectiveness because the room to be air-conditioned has only an outlet port for the conditioned air, and an inlet port for the exterior air to be introduced into the room. Therefore, such centralized air-conditioning system has so far been used widely for the air-conditioning of a large-sized building. Of various centralized air-conditioning systems, the variable air quantity control system adapted to the energy-saving operations (hereinafter simply called "VAV system") is capable of controlling temperature in a plurality of rooms, each having different heat load, independently of the other, is capable of stopping the air-conditioning operation in those rooms which are not in use, is also able to reduce the running cost of the air-conditioning system by changing the power for the air blower in accordance with quantity of air to be blown out, and, at the same time, is able to decrease the capacity of the heat source apparatus by taking into consideration of the rate of its use.

There are two types of the VAV system depending on the construction of the air quantity adjusting damper. The one is a system which uses a bypass type VAV unit (damper unit), wherein a ratio between the air quantity to be blown out into the room depending on the heat load of the room and the air quantity to be directly returned (or bypassed) to the heat source apparatus is adjusted. This type of the VAV system is used in most cases for the air-conditioning system utilizing the package air-conditioners which are difficult to control the capacity of its heat source apparatus, because of the air blowing quantity being kept constant, but this system has no energy-saving effect to be attained by control of the air blower.

The other is a type which uses a throttle type VAV unit, wherein the quantity of air to be blown out into the room is adjusted to an arbitrary value in accordance with the heat load of the room.

This VAV system detects a pressure in the air duct, which varies in conformity with the degree of opening of the damper, and controls the capacity of the air blower in a manner to bring this detected pressure value to a certain determined value. Therefore, when the heat load in the room decreases (that is to say, the air quantity becomes reduced, and the temperature of the air within the duct, at this time, is regulated at a constant level), the required performance of the heat source apparatus becomes reduced and the power for the air blower is also decreased.

As conventional techniques adopting the throttle type VAV unit, there are known that as in Japanese Unexamined Patent publication No. 196029/1982 and that as shown in FIG. 2.10(a) in Manual of Refrigeration and Air-conditioning (new fourth edition, technique for application) published by Nippon Reito Kyokai.

FIG. 1 of the accompanying drawing illustrates a schematic construction of an air conditioning apparatus to be the basis for explanation of the known art as well as the present invention. In FIG. 1, a reference numeral 1 designates rooms to be air-conditioned (in the illustrated case, three rooms are to be air-conditioned). A numeral 2 refers to a room unit disposed in the ceiling part of the building, and which is constructed with an air-filter 3) a heat exchanger 4 and an air blower 5. A main air duct 6 is connected to the air outlet port of the room unit 2, and three branch ducts 7 are diverged from the main air duct 6. A throttle type VAV unit 8 is placed in each of the branch ducts 7. A damper 9 is rotatably fitted within each of the VAV units 8. An outlet port 10 is provided at the end part branch duct 7. An inlet port 11 is provided at the lower part of a door for each room 1, and an inlet port 12 is formed in the ceiling board above the corridor. An inlet duct 13 connects the inlet port of the ceiling to the air inlet port of the room unit 2.

A pressure detector 15 provided with a detecting part is placed in the air duct 6. Also, a temperature detector 16 is placed in the air duct 6.

A reference numeral 14 designates a room thermostat attached in each of the rooms, and a numeral 17 designates a heat source apparatus such as a heat pump connected to the heat exchanger 4.

In the conventional air conditioning apparatus, the degree of opening of the damper 9 is adjusted at an arbitrary position for each room in accordance with a difference between an established temperature set by a user in each room through the room thermostat 14 and an actual temperature of the air detected by a temperature detector. On account of this, the pressure in the air duct 6 changes depending on the degree of opening of the damper 9, the change of which is detected by the pressure detector 15, thereby varying the capacity of the air blower 5 so that the pressure in the air duct 6 becomes a predetermined pressure.

Since the temperature of the outlet air from the heat exchanger 4 varies with changes in the air blowing quantity, this temperature is detected by the temperature detector 16, on the basis of which the capacity of the heat source apparatus 17 is controlled to keep the temperature of the air at a predetermined temperature level.

The air is blown through the outlet port 10 into each of the rooms 1 at flow rates corresponding to the value of the heat load of the room. After air-conditioning, the air in the rooms 1 flows through the inlet port 11, corridor, the inlet port 12 formed in the ceiling and the inlet duct 13 to be returned to the room unit 2.

FIG. 2 is a diagram showing a relation of a cooling load to the quantity of air passed through the VAV unit as shown in FIG. 2.14 in the Manual of Refrigeration and Air-conditioning.

FIG. 2 shows that control is made such that when the cooling load is reduced to a certain value or lower, the quantity of air to be supplied becomes constant, and the temperature of the air becomes high as the cooling load reduces. This system is called a constant air quantity control system (CAV system) in which when a load changes, the temperature of air to be supplied is changed while the quantity of the air is maintained to the minimum extent. The system is suitably used for buildings in which air-conditioning operation is performed while the minimum quantity of ventilation of air is maintained. In FIG. 2, the abscissa represents a cooling load and the ordinate represents the quantity of air and the temperature of the air. In the Figure, the cooling load can be replaced by a difference between room temperature at present and an established temperature, and the quantity of the air can be replaced by the degree of opening of the damper 9. When a room-cooling operation is carried out, the temperature of each of the rooms decreases and the difference between the actual room temperature and the established room temperature becomes small. Accordingly, the dampers 9 are gradually closed whereby the quantity of air is balanced with the heat.

A relation of the quantity of air to a warming load is similar to that of the cooling load.

As other conventional techniques, there have been known those as disclosed in Japanese Examined Patent Publication No. 14979/1980, Japanese Examined Patent Publication No. 44853/1980, Japanese Examined Patent Publication No. 44854/1980 and Japanese Examined Patent Publication No. 24022/1980.

These techniques employ the VAV system in which the degree of opening of the damper 9 is adjusted by manual operation and the air blower and the heat source apparatus are controlled automatically. Namely, a single room temperature detector is placed in a room which tends to be frequently used among many rooms or a passage way of air to be returned. When the room temperature in that room decreases during room-warming operation, the quantity of the air is increased by increasing a pressure of air to be supplied. On the other hand, the quantity of the air is decreased by lowering the pressure of air when the room temperature is increased (This is referred to as a variable static pressure control method). As another method, the temperature of air to be supplied is changed depending on the outer temperature, and the capacity of the heat source apparatus is controlled depending on a heat load (This is referred to as a variable temperature control method).

Japanese Examined Utility Model Publication No. 35694/1981 discloses another VAV system in which the degree of opening of the damper is manually operated, and the air blower and the heat source apparatus are controlled automatically. This system is provided with a static air pressure control part, an air temperature control part and a timer device wherein at least one of the air blower and the heat source apparatus is operated with its maximum power for a certain time just after initiation of operation so that room temperature reaches an established room temperature as fast as possible when the air conditioning apparatus is started. In the conventional air conditioning apparatus using a throttle type VAV unit, the quantity of air is automatically controlled by the damper 9 in the VAV unit 8 in conformity with the heat load of each of the rooms without necessity of correctly balancing the quantity of air to each of the rooms by adjusting the sizes of the branch ducts 7 and the outlet ports 10 even when the heat load of each of the rooms is greatly different from each other. However, the heat load is much influenced by the outer temperature and heat produced in any room. Accordingly, when the heat load is large, and the temperature of air to be supplied and the pressure of air in the duct are controlled at a constant rate, the quantity of air becomes short even though the damper 9 is entirely opened and the room temperature of a room does not reach the established value. On the other hand, when the heat load is small, the quantity of air should be reduced by throttling each of the dampers 9, so that operation has to be performed under the condition that pressure loss is large.

In an air conditioning apparatus in which the dampers 9 are manually operated, when the quantity of air is adjusted by changing air pressure according to a temperature detected by the room temperature detector placed in the specified room, heat to be supplied to the other room having a different heat load is not balanced with heat loss of the room thereby causing change in room temperature. In this case, an occupant has to change by manual operation the degree of opening of the damper 9 of the room. Even in the case that the room temperature detector is placed in a passage of air to be returned, the same condition takes place. Namely, when the outer temperature changes, the heat load of each of the rooms does not constantly change because of heat to be produced in each of the rooms, and the pressure of air is changed only by the temperature of the returned air. Under the condition, when the quantity of air to be supplied to each of the rooms is changed, a caloric balance is lost and change of opening of the damper 9 is needed for some of the rooms.

When the room temperature detector is placed in a specified room which is frequently used, the room does not always produce the greatest heat load. Accordingly, when the air pressure is determined in accordance with the temperature of the room, there happens that it is insufficient to warm a room even though the damper 9 is entirely opened. When the damper 9 is closed for each of the rooms and the temperature of the specified room is not utilized, a suitable control for air pressure can not be obtained.

In addition, the heat load of each of the rooms is largely affected by heat produced in the rooms even though the temperature of air to be supplied is changed depending on the outer temperature and capacity of room-warming is adjusted. Accordingly, the optimum operation in conformity with the heat load can not be always obtained. Further, it is difficult to maintain the temperature of each of the rooms at a desirable level because the quantity of air to be supplied to each of the rooms having different heat load has to be adjusted by manually operable dampers 9.

SUMMARY OF THE INVENTION

It is an object of the present invention to provide an air conditioning apparatus capable of controlling room temperature at an established value in the case of a large heat load and of reducing the power for the air blower in the case of a small heat load.

The object of the present invention is to provide an air conditioning apparatus comprising a heat source apparatus for producing warm air or cool air, an air blower and an air duct for distributing the warm air or the cool air from the heat source apparatus to each of rooms, air quantity adjusting dampers, each being disposed in a branched duct connected to the air duct for each room, and a room thermostat disposed in each of the rooms, which is characterized by comprising a heat load measuring means which receives signals corresponding to an established room temperature determined by the room thermostat and an actual room temperature detected by the room thermostat, and measures a heat load for each of the rooms based on the difference between the established temperature and the detected temperature, a damper control means for controlling the degree of opening of the dampers on the basis of an output of the heat load measuring means, at least one among an established temperature determining means for determining the value of the established temperature for the air passing in the air duct and an established pressure determining means for determining the value of the established pressure for the air in the air duct, by cooperation with another means or by itself based on the value of the heat load of each of the rooms measured by said heat load measuring means, wherein at least one among the air blower and said heat source apparatus is controlled by using an output from at least one among the established temperature determining means and the established pressure determining means, together with an output from the cooperation means, if any.

The present invention is to provide an air conditioning apparatus comprising a capacity changeable type heat source apparatus for producing warm air or cool air, a capacity changeable type air blower and an air duct for distributing the warm air or the cool air from the heat source apparatus to each of rooms, air quantity adjusting dampers, each being disposed in a branched duct connected to the air duct for each room, and a room thermostat disposed in each of the rooms, which is characterized by comprising a heat load measuring means which receives signals corresponding to an established room temperature determined by the room thermostat and actual room temperature detected by the room thermostat, and measures a heat load for each of the rooms based on the difference between the established temperature and the detected temperature, a damper control means for controlling the degree of opening of the dampers on the basis of an output of the heat load measuring means, an operating condition measuring means which receives and processes an output from the damper control means and detection outputs from a pressure detector and a temperature detector disposed in the air duct in such a manner that in a period just after initiation of room-warming or room-cooling operation caused by starting a compressor, at least one between the pressure of the air forcibly fed by the air blower in the air duct and the temperature of the air heated by the heat source apparatus is determined to be brought to the maximum value (the minimum value for room-cooling operation) until the value of a heat load in each of the rooms measured by the heat load measuring means reaches an established value, and when the heat load reaches the established value and the room-warming (room-cooling) operation is under normal condition, the value of pressure of the air and the value of temperature of the air are determined to be brought to values for the normal operation, an air blowing quantity determining means for determining the capacity of the air blower based on an output from the operating condition measuring means, a blower control means for controlling the air blower based on an output from the air blowing quantity determining means, a capacity determining means for determining the capacity of the heat source apparatus based on an output from the operating condition measuring means, and a heat source apparatus controlling means for controlling the capacity of the heat source apparatus based on an output from the capacity determining means.

BRIEF DESCRIPTION OF THE DRAWINGS

FIG. 12 is a block diagram showing the construction of a fourth embodiment of the present invention;

DETAILED DESCRIPTION OF THE PREFERRED EMBODIMENTS

In the following, preferred embodiments of the air conditioning apparatus according to the present invention will be described with reference to drawings.

Figure 1:
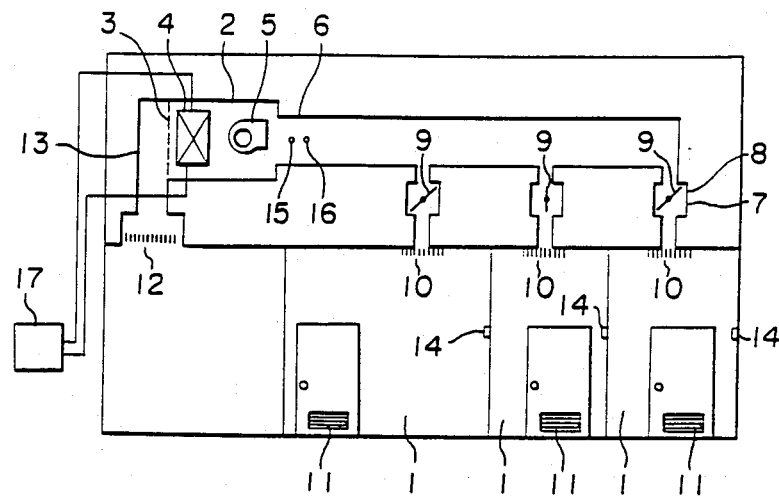
FIG. 1 is a diagram showing the construction of a conventional air conditioning apparatus.
Figure 2:
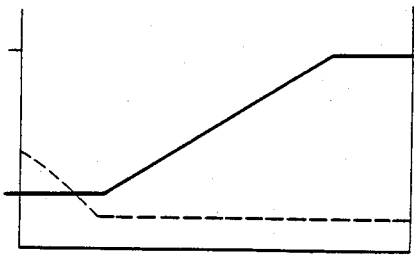
FIG. 2 is a diagram showing a relation of a cooling load to the quantity of air in the conventional air conditioning apparatus.
Figure 3:
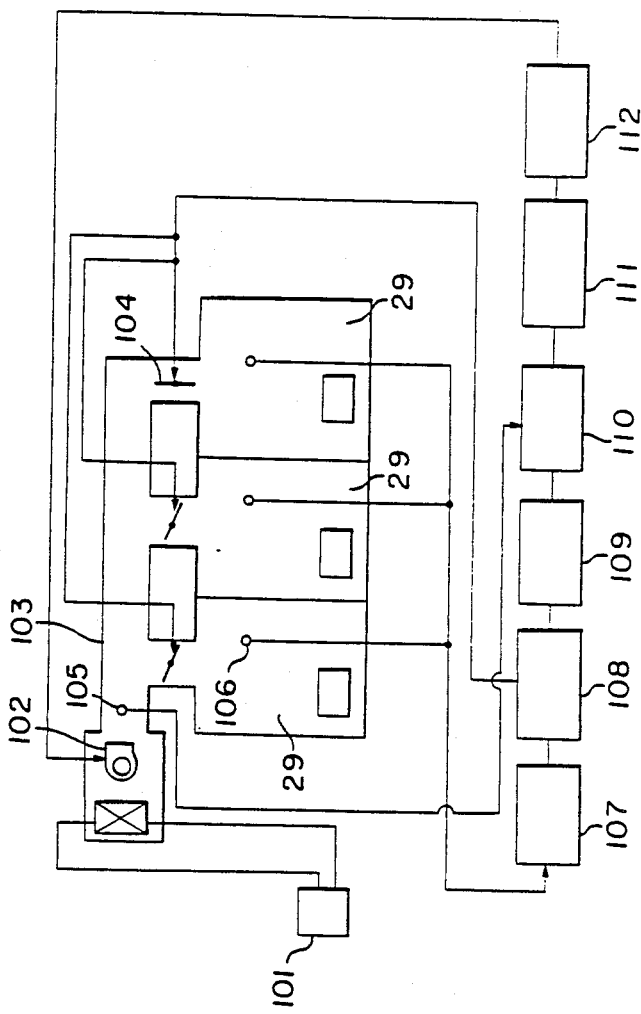
FIG. 3 is a diagram showing the construction of a first embodiment of the air conditioning apparatus according to the present invention.

FIG. 3 shows a first embodiment of the present invention.

In FIG. 3, the air conditioning apparatus is provided with a heat source apparatus 101 for producing warm air or cool air, a capacity changeable type air blower 102 for forwarding the warm or cool air from the heat source apparatus 101, an air duct 103 connected to the outlet of the air blower 102, branch ducts for connecting the air duct 103 to each of rooms 29, a damper 104 disposed in each of the branch ducts 103 to regulate the quantity of air, a pressure detector 105 placed in the air duct 103 to detect the pressure of the air to be forwarded to the rooms, and a room thermostat 106 attached to each of the rooms 29.

A detection signal from each of the room thermostats 106 is input in a heat load measuring means 107 in which the heat load is measured for each of the rooms 29. An output of the heat load measuring means as a result of measuring the heat loads is input in a damper control means 108 to thereby control the degree of opening of each of the dampers 104. Then, determination is made by an established pressure determining means 109 as to a pressure in the air duct 103 depending on the greatest value among the heat loads in the rooms 29. A signal from the established pressure determining means 109 and a detection signal from the pressure detector 105 are input in a pressure measuring means 110. Then, a signal from the pressure measuring means 110 is input in a blower-capacity determining means 111 to determine the capacity of the air blower 102. The capacity of the air blower 102 is controlled by a blower control means 112 based on an output of the blower capacity determining means 111.

The operation of the first embodiment shown in FIG. 3 will be described with reference to a flow chart indicating a program of controlling the air blower of FIG. 4 and a diagram showing a relation of a heat load to an established pressure of FIG. 5.

Although it is preferable that the control of the air blower is performed by using a microcomputer, the detail of the circuit is omitted. The explanations of the capacity control of the heat source apparatus 101 to make the temperature of air constant and control of opening the dampers 104 to regulate the quantity of air in conformity with the heat loads are also omitted.

Figure 4:
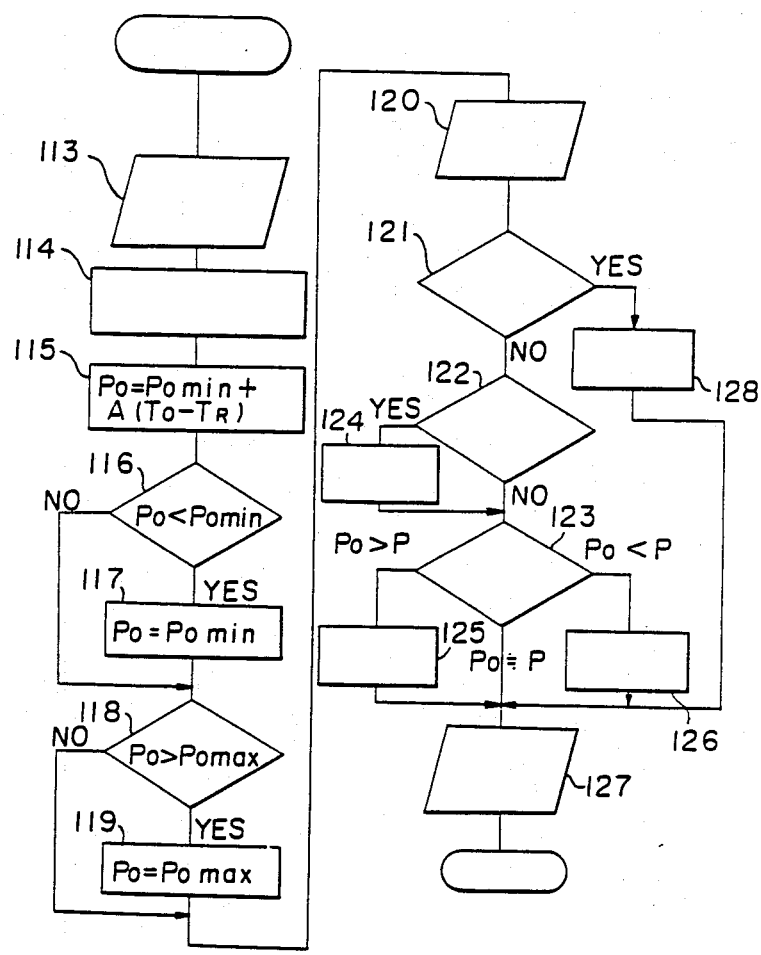
FIG. 4 is a flow chart for explaining the controlled operations of the air conditioning apparatus shown in FIG. 3.
Figure 5:
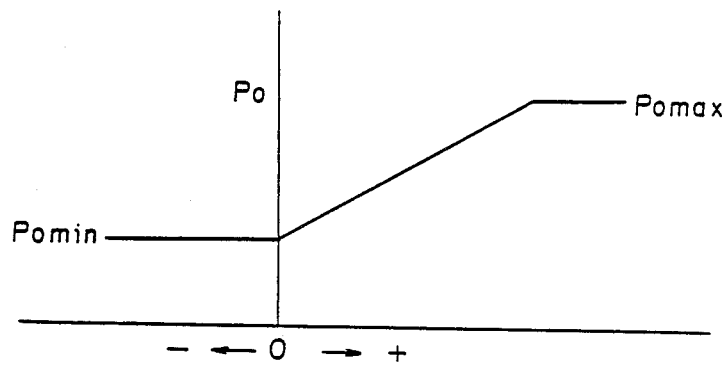
FIG. 5 is a diagram showing a relation of a heat load to an established pressure of the first embodiment.

As shown in FIG. 4, at Step 113, signals indicative of an established temperature $T_o$ and an actual room temperature $T_R$ are input to the heat load measuring means 107 from the room thermostat 106 placed in each of the rooms 29. If the actual room temperature is equal to the established temperature, change of the degree of opening of the dampers 104 is not made. If the room temperature is lower than the established temperature, the dampers 104 are controlled so that they are gradually opened. If the room temperature is higher, the dampers 104 are controlled to be closed.

At the next Step 114, the greatest value among the heat loads which is obtained by the difference between the room temperature and the established temperature in each of the rooms which are air-conditioned. In this case, each of the heat loads is obtained by subtracting the room temperature from the established temperature (heat load = set temperature − room temperature).

At the next Step 115, $P_o$ is obtained by the calculation of $P_o = P_o \min + A(T_o - T_R)$, where $P_o$ is an established pressure, $P_o \min$ is an established lower limit pressure (a constant) which is determined within the range that the air blower 102 can be stably operated and A is a constant.

The value of the established pressure is given in determination of whether or not it is lower than the established lower limit pressure ($P_o$ min) at Steps 116 and 117. If it has a lower value, $P_o = P_o$ min is established.

Similarly, the established pressure is given at Steps 118 and 119 as a result of determination as to whether or not it is higher than the established upper limit pressure ($P_o$ max). If it has a higher value, then, $P_o = P_o$ max is established.

At Step 120, a signal is input from the pressure detector 105 whereby a pressure P in the duct 103 is measured.

At the next Step 121, determination is made as to whether each of the dampers 104 is entirely closed or it is in nearly closed condition which exceeds the limit of operational capacity. If the condition that it is entirely closed is found, then, next Step 122 is taken. In Step 122, determination is made as to whether or not the air blower 102 is actually operated. If it is actuated, the operational sequence goes to Step 123. If it is stopped, the air blower is actuated and operations are forwarded from Step 124 to 123.

At Step 123, the established pressure $P_o$ is compared with an actual value of pressure P. If $P_o > P$, the revolution of the air blower 102 is increased depending on the difference between $P_o$ and P (Step 125). If $P_o < P$, the revolution of the air blower 102 is decreased (Step 126). If the actual pressure P is in the range of non-sensing region of the established pressure $P_o$, the revolution of the air blower is not changed and the operational sequence goes to the next Step 127.

When all dampers 104 are entirely closed a Step 121, the air blower 102 is stopped (at Step 128) and the operational sequence goes to Step 127.

At Step 127, control of the revolution of the air blower 102 is repeated at a fixed time interval by a controller such as a thyristor.

When the room temperature of a specified room or a plurality of rooms is fairly lower than the established room temperature in a series of the control operations, the value of the established pressure is brought to be high. At the same time, the degree of opening of the dampers 104 is in proportion to the value of the heat loads. Accordingly, the damper 104 of the room 29 having the greatest heat load is brought to the entirely opened state. As a result, a large quantity of warm air is supplied to the room having the greatest heat load whereby the room temperature is rapidly increased.

On the other hand, the damper 104 of the room 29 whose room temperature is kept into a satisfactory condition is throttled whereby a suitable quantity of warm air is supplied.

When the room temperature of each of the rooms 29 reaches the respective established room temperature and the value of the greatest heat load becomes small, the value of the established pressure is reduced to thereby reduce the quantity of air. When the room temperature decreases depending on reduction of the air supply, each of the dampers 104 is operated to be opened, and finally, all the dampers 104 are operated in the almost opened state under the established low pressure. Accordingly, the air blower 102 is operated with small pressure loss and power to be supplied to the air blower 102 is reduced.

In the embodiment described above, the value of the established pressure $P_o$ is fixed to the value $P_o$ min at the greatest heat load, namely, the value ($T_o - T_R$) is maximum. However, such determination is not essential.

Further, the same function is obtainable by replacing the position of the pressure measuring means 110 by the established pressure determining means 111 in FIG. 3.

The capacity of the air blower 102 can be controlled by another controlling means instead of the thyristor for controlling the revolution of the air blower 102.

In the above-mentioned embodiment, the value of the established pressure is determined on the basis of the value of the greatest heat load (i.e., the greatest value among the values obtained by subtracting the value of the actual temperature of each of the rooms which is air-conditioned from the value of the established room temperatures). However, the greatest heat load can be obtained by measuring temperature for each controlling timing, by measuring the temperature at a predetermined interval or by measuring an integrated value of temperature or a mean value in a time period.

For the greatest heat load, the smallest value (the greatest value for the room-cooling operation) among the room temperatures in the rooms except rooms which are not subjected to air-conditioning, may be used, and the value of the established pressure is determined based on the smallest value.

In the first embodiment, the established pressure in the duct is determined depending on the value of the greatest heat load, and a suitable quantity of air is supplied to each of the rooms on the basis of determination of the established pressure. Accordingly, the room temperature can be correctly controlled with respect to the established temperature even when the heat load is large, and the air blower can be operated with a small power when the heat load is small.

Figure 6:
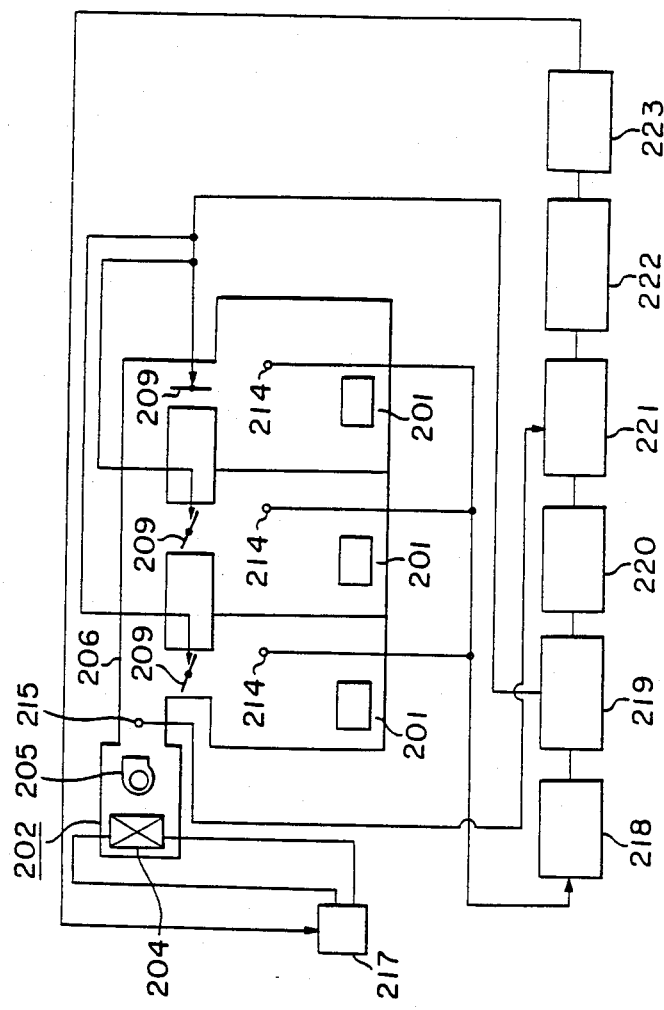
FIG. 6 is a diagram showing the construction of a second embodiment of the present invention.

FIG. 6 is a diagram showing a schematical construction of a second embodiment of the air conditioning apparatus of the present invention.

In FIG. 6, a reference numeral 217 designates a capacity changeable type heat source apparatus such as a heat pump which is connected to a heat exchanger 204 placed in a room unit 202 and a numeral 205 designates an air blower for forwarding warm air or cool air produced by the heat source apparatus 217 and heat exchanger 204 to each of rooms 201 under a substantially constant pressure. A temperature detector 205 is disposed in an air duct 206 at the vicinity of the outlet of the air blower 205 to detect the temperature of the air to be blown from the air blower. A room thermostat 214 and a damper 209 for each of the rooms 201 are similar to those as shown in FIG. 3.

The air conditioning apparatus of the second embodiment is constructed in such a manner that the value of the heat load of each of the rooms 201 is measured by a heat load measuring means 218 which receives an established temperature signal and a detected temperature signal from the room thermostat 214; an output of the heat load measuring means 218 is input in a damper control means 219 to control the degree of opening of each of the dampers 209; then, the value of the temperature of air is determined by an established temperature determining means 220 in accordance with the greatest value of the heat loads in the rooms 201; a value determined by the established temperature determining means 220 and a detection signal from the temperature detector 215 are input in a temperature measuring means 221; an output of a temperature measuring means 221 is input in a capacity determining means 222 whereby the capacity of the heat source apparatus 217 is determined; and a capacity control means 223 controls the capacity of the heat source apparatus 217 based on the output of the capacity determining means 222.

Figure 8:
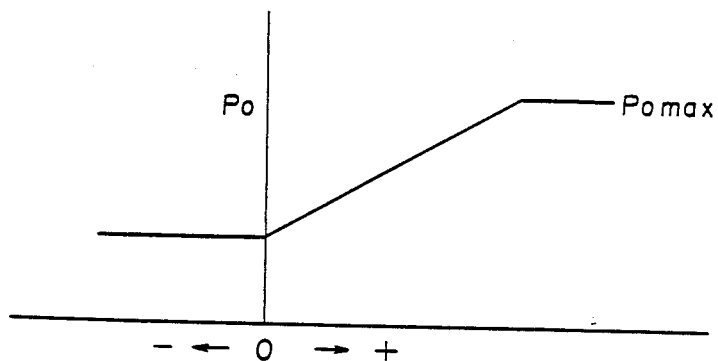
FIG. 8 is a diagram showing a relation of a heat load to an established temperature of the second embodiment.
Figure 7:
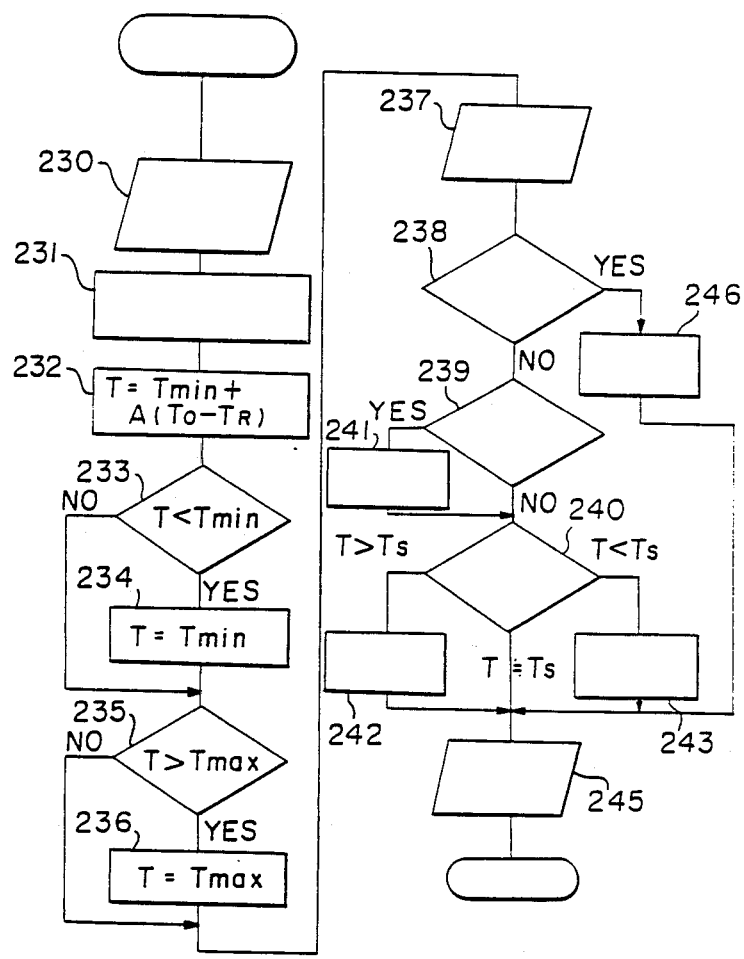
FIG. 7 is a flow chart for explaining the controlled operations of the second embodiment.

The operation in room-warming mode of the second embodiment will be described with reference to FIG. 7 showing a flow chart of a program for controlling the heat source apparatus and FIG. 8 showing a diagram for explaining the established temperature. As similar to FIG. 3, explanation concerning a microcomputer, the capacity control of the air blower 205 and control of opening of the damper 209 is omitted.

When the air conditioning apparatus is started for room-warming operation, the controlling program as shown in FIG. 7 is initiated.

The established room temperature $T_o$ and the actual room temperature $T_R$ for each room are input in the heat load measuring means 218 from each of the room thermostats 214. If the actual room temperature is equal to the established room temperature, the degree of opening of the dampers is not changed. If the room temperature is lower than the established room temperature, the dampers are controlled to be gradually opened, and contrary, if the room temperature is higher than the established room temperature, the dampers are moved to the direction of closing.

At Step 231, the greatest value among the heat loads is found. Each of the heat loads is obtained from the difference between the actual room temperature $T_R$ and the established room temperature $T_o$ for each of the rooms except rooms which are not air-conditioned (heat load=established room temperature $T_o$−real room temperature $T_R$). At Step 232, calculation of $T = T_{min} + A(T_o - T_R)$ is performed to find T, where T is an established value of the temperature of air, $T_{min}$ is an established lower limit temperature (a constant) determined within a range for allowing the heat source apparatus 217 to operate stably, and A is a constant.

At Step 233, determination is made as to whether the value of the established temperature T is lower than the established lower limit temperature $T_{min}$. If the determination of YES, $T = T_{min}$ is established at the next Step 234. On the other hand, if the determination of NO is provided at Step 233, the operational sequence goes to Step 235 at which determination is made as to whether or not the established temperature T is higher, than the established upper limit temperature $T_{max}$. If the determination is YES, $T = T_{max}$ is established at Step 236.

At Step 237, a signal from the temperature detector 215 is received to measure the temperature $T_s$ in the duct 206. Then, operational sequence goes to the next Step 238 at which determination is made as to whether or not each of th dampers 209 is entirely closed or in a nearly closed state which exceeds the limit of operation of the air conditioning apparatus. If the dampers are not entirely closed, determination is made as to whether the heat source apparatus 217 is operated at Step 239. If the heat source apparatus 217 is operated, the operational sequence goes to the next Step 240. If the heat source apparatus is stopped, it is started at Step 241 which follows the next Step 240. At Step 240, the value of T is compared with the value of $T_s$. If $T > T_s$, the capacity of the heat source apparatus 217 (the revolution of a compressor when a heat pump is used as the heat source apparatus) is increased depending on the difference between T and $T_s$ (Step 242). If $T < T_s$, the capacity is decreased (Step 243). If T is in a non-sensitive zone of $T_s$, the revolution of the heat source apparatus is not changed and the next Step 245 is taken. When each of the dampers 209 is found to be in the entirely closing state, the heat source apparatus 217 is stopped (Step 246), and the operational sequence proceeds to the next Step 245. At Step 245, control of the revolution of the heat source apparatus 217 is carried out by means of a controller which may be an inverter. The control of the heat source apparatus is repeated at a fixed time interval. During the series of the controlling operations, when the room temperature of a specified room or a plurality of rooms is far lower than the established room temperature, the value of the established temperature is established high. At the same time, the damper 209 for the room 201 having the greatest heat load is brought to the entirely opened state because the degree of opening of the damper is in proportion to the value of the heat load. As a result, a large quantity of air having a higher temperature is supplied to the room having the greatest heat load to rapidly raise the room temperature of the room. On the other hand, the damper 209 for the room whose room temperature is in satisfactory condition is throttled and a suitable amount of warm air is supplied to the rooms. In the case that the room temperature of the rooms 201 respectively reach the established room temperature and the value of the greatest heat load becomes small, the value of the established temperature is decreased so that the temperature of air is reduced thereby reducing the room temperatures. In this case, all the dampers 209 are operated to be opened. Finally, the room warming operation is carried out is a low established temperature and under the condition that the dampers 209 are entirely opened. Accordingly, the air blower 205 is operated at a small pressure loss whereby a power for the air blower is reduced.

In the second embodiment, the value of the established temperature T is fixed to the established upper limit temperature $T_{max}$ at the greatest heat load, namely, the value of $(T_o-T_R)$ is maximum. However, such determination is not essential.

Further, the same function is obtainable by replacing the position of the temperature measuring means 220 by the established temperature determining means 221 in FIG. 6.

The capacity of the heat source apparatus 217 can be controlled by another control means instead of the inverter for controlling the revolution of the heat source apparatus 217.

In the embodiment, the value of the established temperature is determined on the basis of the value of the greatest heat load (the greatest value among the values obtained by subtracting the value of the actual room temperature from the value of the established room temperature for each of the rooms). However, the greatest heat load can be obtained by measuring temperature for each controlling timing, by measuring the temperature at a predetermined interval, or by measuring an integrated value of the temperature or a mean value in a time period.

For determination of the greatest heat load, the smallest value (the greatest value for the room cooling operation) among the room temperatures in the rooms except for rooms which are not subjected to air-conditioning, may be used (the value of the established temperature is determined based on the smallest value.

In the second embodiment, the degree of opening of the dampers 209 is determined in proportion to the value of the heat load. However, the dampers 209 may be controlled at two positions of entirely open and entirely closed.

Thus, in the second embodiment, the established temperature in the duct is determined depending on the value of the greatest heat load, and a suitable amount of warm air is supplied to each of the rooms in accordance with determination of the established temperature. Accordingly, the room temperature can be correctly controlled with respect to the established temperature even when the heat load is large, and the air blower can be operated with a small power when the heat load is small.

Figure 9:
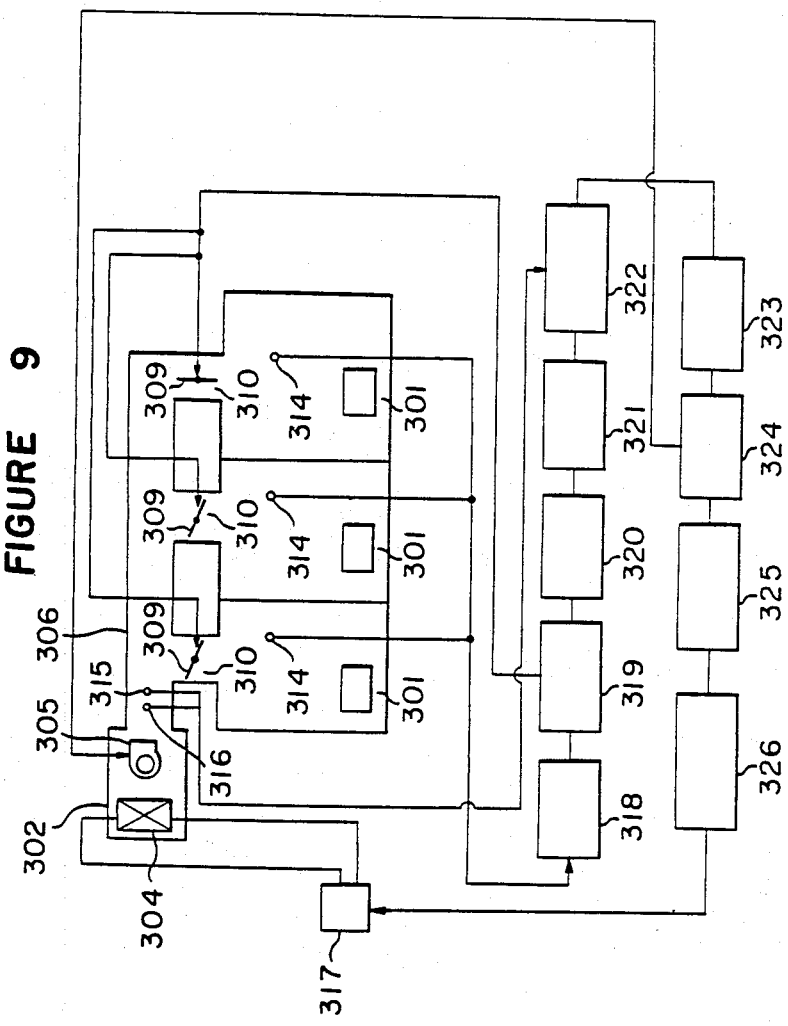
FIG. 9 is a diagram showing the construction of a third embodiment of the present invention.

FIG. 9 is a schematic view showing the entire system of a third embodiment of the air conditioning apparatus according to the present invention.

In FIG. 9, the air conditioning apparatus is provided with a capacity changeable type heat source apparatus 317 such as a heat pump which is connected to a heat exchanger 304 disposed in room unit 302, a capacity changeable type air blower 305 for feeding warm air or cool air produced by the heat source apparatus 317 and the heat exchanger 304, an air duct 306 connected to the outlet of the air blower 305, branch ducts for connecting the air duct 306 to each of rooms 301, a damper 309 disposed in each of the branch ducts 310 to regulate the quantity of air, a pressure detector 316 placed in the air duct 306 to detect the pressure of the air, a temperature detector 315 placed in the air duct 306 to detect the temperature of the air to be forwarded to the rooms 301 and a room thermostat 314 attached to each of the rooms 301.

A signal of an established temperature and a detection signal of temperature from each of the room thermostats 314 are input in a heat load measuring means 318 in which the heat load is measured for each of the rooms 301. An output from the heat load measuring means is input in a damper control means 319 to control the degree of opening of each of the dampers 309. Then, the greatest value of the heat load among the heat loads in the rooms 301 is found, and an established pressure determining means 320 determines the value of a pressure in the duct 306 according to the greatest heat load. At the same time, determination is made by an established temperature determining means 321 as to the temperature of the air in the duct 306. A pressure-temperature measuring means 322 receives detection signals from the pressure detector 316 and the temperature detector 315 as well as a signal as a result of determination by the established pressure determining means 320 and the established temperature determining means 321. Based on the output of the pressure-temperature measuring means 322, the capacity of the air blower 305 and the capacity of heat source apparatus 317 are respectively determined by a blower-capacity determining means 323 and a heat capacity determining means 325. A blower control means 324 controls the capacity of the air blower 305 based on the output of the determining means 323, and a heat source apparatus control means 326 controls the capacity of the heat source apparatus 317 based on the output of the determining means 325.

The operation for room-warming of the third embodiment will be described with reference to a flow chart of FIG. 10 and a diagram of FIG. 11.

Explanation of controlling the air conditioning apparatus by using a microcomputer and the circuit of the computer is omitted. Also, explanation of controlling the degree of opening of the dampers 209 to regulate the quantity of air to be supplied in conformity with the heat loads in the rooms is omitted.

Figure 10:
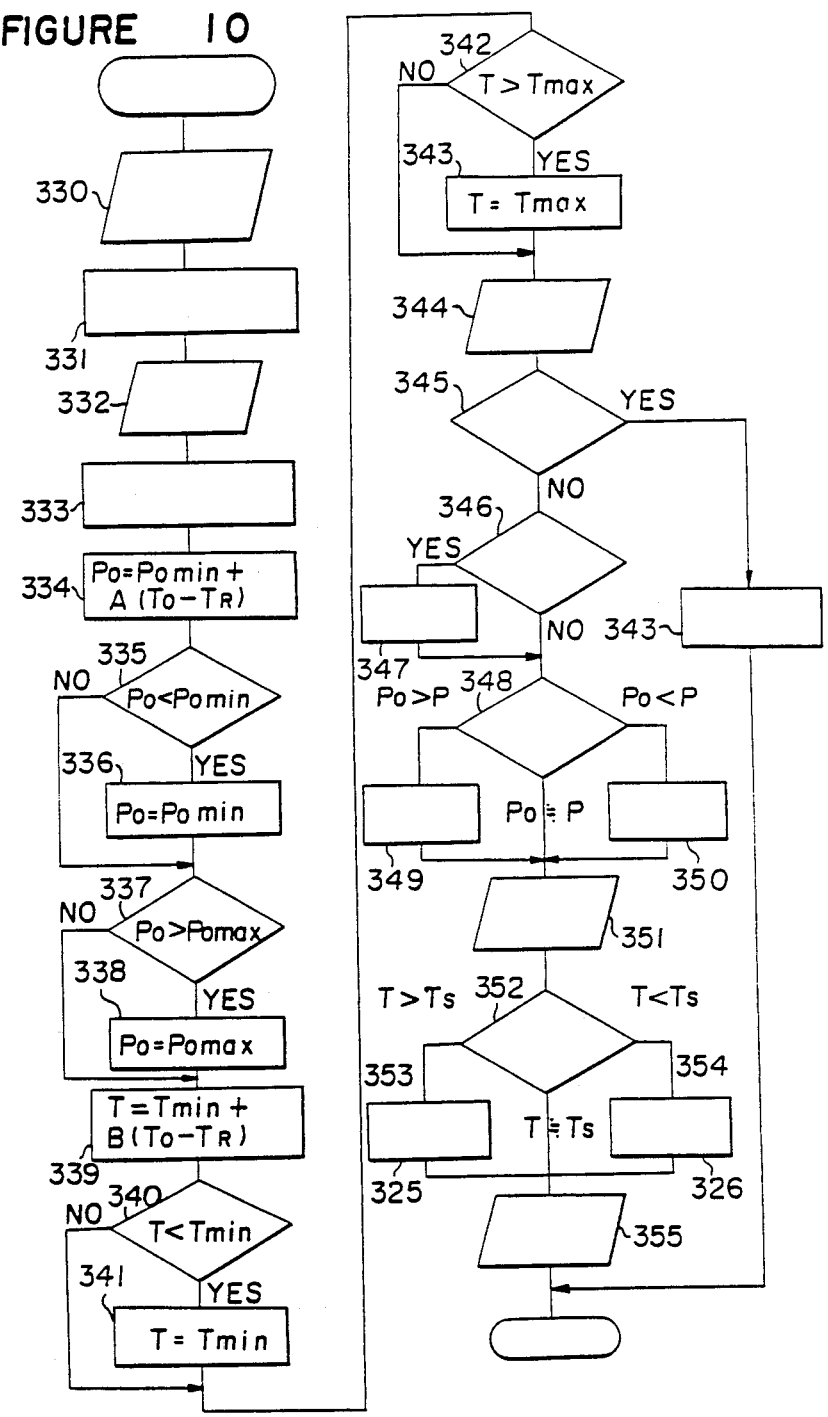
FIG. 10 is a flow chart for explaining the controlled operations of the apparatus as shown in FIG. 9.
Figure 11:
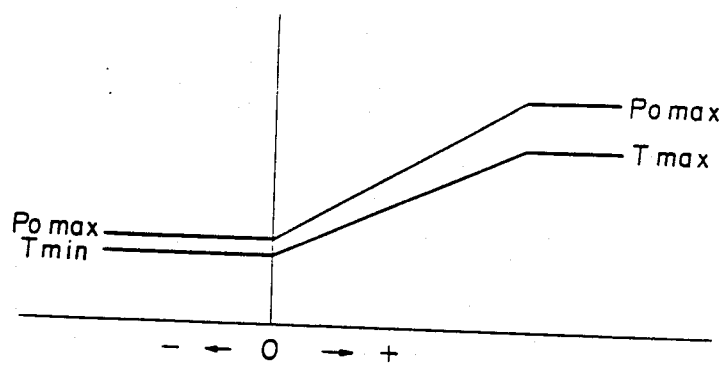
FIG. 11 is a diagram showing a relation of a heat load to an established value.

As shown in FIG. 10, a controlling program is started upon initiation of room warming operation of the air conditioning apparatus. At Step 330, the values of an established room temperature $T_o$ and an actual room temperature $T_R$ are input in the heat load measuring means 318 from the room thermostat 314 attached in each of the rooms 301. Determination of the degree of opening of each of the dampers 309 is made according to the inputs at Step 331. In this case, if the actual room temperature is equal to the established room temperature, change of the degree of opening of the dampers 309 is not made. If the actual room temperature is low, the dampers 309 are controlled to be opened; while if high, they are controlled to be closed (Step 332).

At Step 333, the greatest value of the heat load is found among the heat loads, each of which values is obtained by the difference between the actual room temperature $T_R$ and the established room temperature $T_o$ for each of the rooms except for rooms which are not subjected to air-conditioning. In this case, heat load = established room temperature $T_o$ actual temperature $T_R$.

At Step 334, $P_o$ is found by the calculation of $P_o = P_{o\ min} + A(T_o - T_R)$, where $T_o$ is an established temperature, $P_{o\ min}$ is an established lower limit pressure (a constant) which is determined within the range that the air blower 305 can be stably operated and A is a constant. At Step 335, determination is made as to whether the value of the established pressure $P_o$ is lower than the established lower limit pressure $P_{o\ min}$. In this case, if the established pressure $P_o$ is low, $P_o = P_{o\ min}$ is established at Step 336. On the other hand, if the result of determination at Step 335 is "NO", then, the operational sequence goes to Step 337 at which determination is made as to whether the established pressure $P_o$ is higher than the established upper limit pressure $P_{o\ max}$. If the established pressure $P_o$ is high, $P_o = P_{o\ max}$ is established at Step 338.

At Step 339, T is obtained by the calculation of $T = T_{min} + B(T_o - T_R)$, where T is an established temperature, $T_{min}$ is an established lower limit temperature (a constant) which is determined in consideration of the characteristics of the heat source apparatus 317 and B is a constant. At Step 340, determination is made as to whether or not the value of the established temperature T is lower than the established lower limit temperature $T_{min}$. If the established temperature T is low, $T = T_{min}$ is established at Step 341. If a result of determination at Step 340 is "NO", then determination is made as to whether or not the established temperature T is higher than the established upper limit temperature $T_{max}$ at Step 342. If the established temperature T is higher $T = T_{max}$ is established at Step 343.

At Step 344, the current pressure P and temperature $T_s$ in the air duct is measured by using the signals of the pressure detector 315 and the temperature detector 316. Then, the operational sequence is goes to Step 345 at which determination is made as to whether each of the dampers 309 is entirely closed or it is in a nearly closed state which exceeds the limit of the operational capacity. If they are not in the entirely closed or the nearly closed state, determination is made as to whether the heat source apparatus 317 is actually operated at Step 346. If a result of the determination is "YES", then the next Step 348 is taken. If "NO", the operational sequence goes to Step 348 via Step 347 at which the heat source apparatus 317 and air blower 305 are operated. At Step 348 for comparing the value of P with the value $P_o$, if $P_o > P$, the capacity of the air blower 305, i.e. the number of revolution (rpm) is increased depending on the difference between P and $P_o$ (Step 349). If $P < P_o$, the capacity of the air blower 305 is decreased (Step 350). If the actual pressure is within a non-sensing region of the established pressure $P_o$, the revolution of the air blower 305 is not changed, and the operational sequence goes to the next Step 351.

At Step 351, the control of the revolution of the air blower 305 is carried out by a controller such as a thyristor. Then, the established temperature T is compared with the actual temperature $T_s$ at Step 352. If $T > T_s$, the capacity of the heat source apparatus 317 (the revolution of a compressor when a heat pump is used as the heat source apparatus) is increased depending on the difference between T and $T_s$ (Step 353). If $T < T_s$, the capacity is decreased (Step 354). If the established temperature T is within a non-sensing region of the actual temperature $T_s$, the capacity of the heat source apparatus 317 is not changed, and the operational sequence goes to the next Step 355. At Step 355, the control of the revolution of the heat source apparatus 317 is carried out by a controller such as an inverter. When it is found that all the dampers 9 are entirely closed at Step 345, then, Step 356 is taken and the air blower 305 and the heat source apparatus 317 are stopped.

The control as above-mentioned is repeated at a fixed time interval. During the controlling operation when the room temperature of a specified room or a plurality of rooms is fairly lower than the established room temperature, the value of the established pressure and the value of the established temperature are determined to be high. Further, the damper for the room 301 having the greatest heat load is brought to a substantially entirely opened state because the degree of opening of the damper 309 is in proportion to the value of the heat load. As a result, a large quantity of air elevated at relatively high temperature is supplied to the room having the greatest heat load, whereby the temperature of the room is rapidly increased. On the other hand, the damper 309 of the room 301 in which the room temperature is in a substantially satisfactory condition is throttled so that a suitable amount of warm air is supplied to the room. When the room temperature of all the rooms 301 respectively reaches the established room temperature and the value of the greatest heat load becomes small; the value of both the established pressure and the established temperature are decreased, whereby the quantity of air and the temperature of air to be supplied are reduced. When the room temperature is reduced as the quantity of air and the temperature of air are reduced, each of the dampers 309 is operated. Finally, the air conditioning apparatus is operated under the condition of a low established pressure and a low established temperature and with the dampers 309 of a nearly entirely opened state. Accordingly, the air blower 305 is operated at a small power loss and a power for the air blower is decreased.

In the third embodiment, the value of the established pressure $P_o$ and the value of the established temperature T are respectively fixed to the value of $P_{o\ min}$ and the value of $T_{min}$ when the greatest heat load is found, namely, the value of $T_o - T_R$ is maximum. However, it is not always necessary to determine such values on this basis.

In the third embodiment, although the air blower 305 and the heat, source apparatus 317 are operated in the operational sequence as shown in FIG. 9, they may be operated in accordance with the order of Steps 322, 321, 320, 325, 326, 323 and 324.

In the third embodiment, the revolution of the air blower 5 is controlled by the thyristor and the capacity of the heat source apparatus 317 is controlled by the inverter. However, they may be controlled by other control means.

Further in the above-mentioned embodiment, the values of the established pressure and the established temperature are determined on the basis of the value of the greatest heat load (i.e. the greatest value among the values obtained by subtracting the value of the actual temperature from the established room temperature in each of the rooms which is air-conditioned). However, the greatest heat load can be obtained by measuring temperature for each controlling timing, by measuring the temperature at a predetermined interval, or by measuring an integrated value of temperature or a mean value in a time period.

As the greatest heat load, the smallest value among the values of room temperature in each of the rooms except for the rooms which are not subjected to air-conditioning (the greatest value for room cooling operation) may be used, and the values of the established pressure and the established temperature may be determined in accordance with the smallest value.

Thus, in the third embodiment of the present invention, the established pressure and the established temperature in the air duct are determined depending on the value of the greatest heat load, and each of the rooms is supplied with a suitable quantity of air and a suitable temperature of warm air or cool air on the basis of the determination. Accordingly, the room temperature can be correctly controlled with respect to the established value even when the heat load is large, and the air blower can be operated with a small power when the heat load is small.

In the following, a fourth embodiment of the present invention will be described with reference to FIGS. 12 to 15.

In FIG. 12, a reference numeral 401 designates a capacity changeable type heat source apparatus for producing warm air or cool air and a numeral 402 designates a capacity changeable type air blower for feeding the warm air or the cool air from a heat exchanger and the heat source apparatus toward an air duct 403. The air duct 403 is connected to the outlet port of the air blower 402. An air regulating damper 404 is provided in each branch duct connected to the air duct 403. A pressure detector 405 and a temperature detector 406 are placed in the air duct 403 to detect the pressure of the air and the temperature of the air in the air duct 403 respectively. Detection signals from the pressure detector 405 and the temperature detector 406 are supplied to a pressure-temperature measuring means 412.

A room thermostat 407 is attached to each of rooms to detect the temperature of air in each room. A detection signal from the room thermostat 407 is supplied to a heat load measuring means 408. The heat load measuring means 408 measures the value of a heat load in each of the rooms. The output of the heat load measuring means 408 is supplied to a damper control means 409 by which the degree of opening of the dampers 404 is controlled. An established pressure determining means 410 determines the value of pressure in the air duct 403 on the basis of outputs from the damper control means 409 and the heat load measuring means 408, and an established temperature determining means 411 determines the value of temperature of supplied air.

The pressure - temperature measuring means 412 receives a signal as a result of determination from the established temperature determining means as well as the detection signals from the pressure detector 405 and the temperature detector 406. The output of the pressure-temperature measuring means 412 is supplied to an air blowing quantity determining means 413 and a capacity determining means 415 which respectively determine the capacity of the air blower 402 and the capacity of the heat source apparatus 401.

An air blower control means 414 controls the capacity of the air blower 402 based on the output of the air blowing quantity determining means 413, and a heat source apparatus control means 416 controls the capacity of the heat source apparatus 401 on the basis of the output of the capacity determining means 415.

Figure 13:
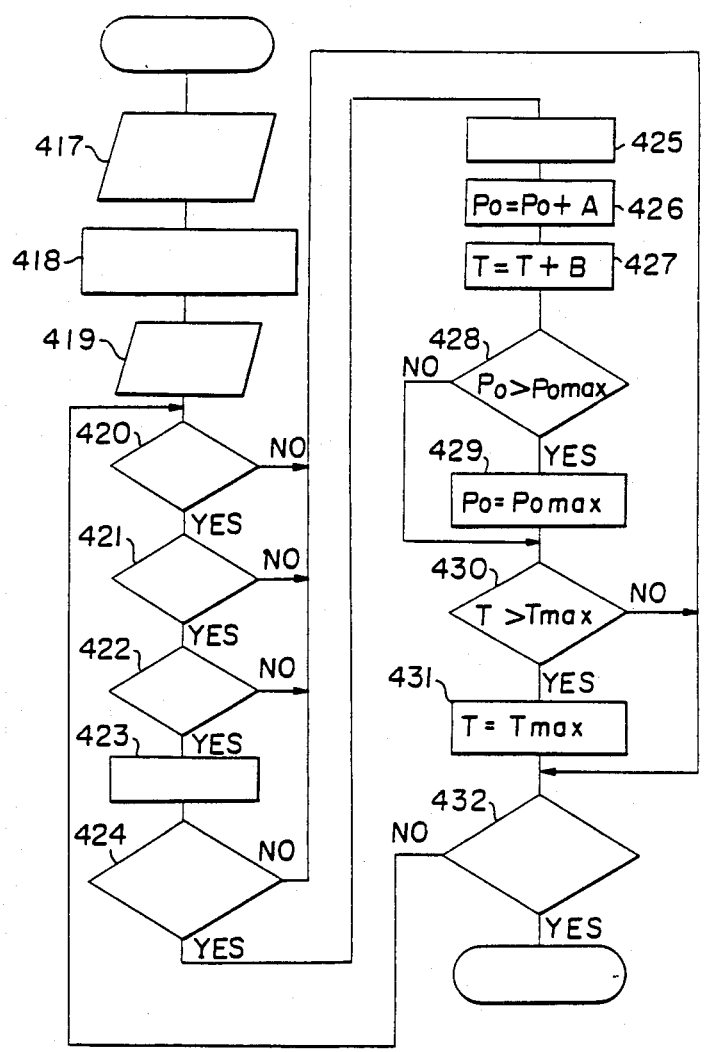
FIGS. 13 to 15 are respectively flow charts for explaining the operations of the fourth embodiment.
Figure 14:
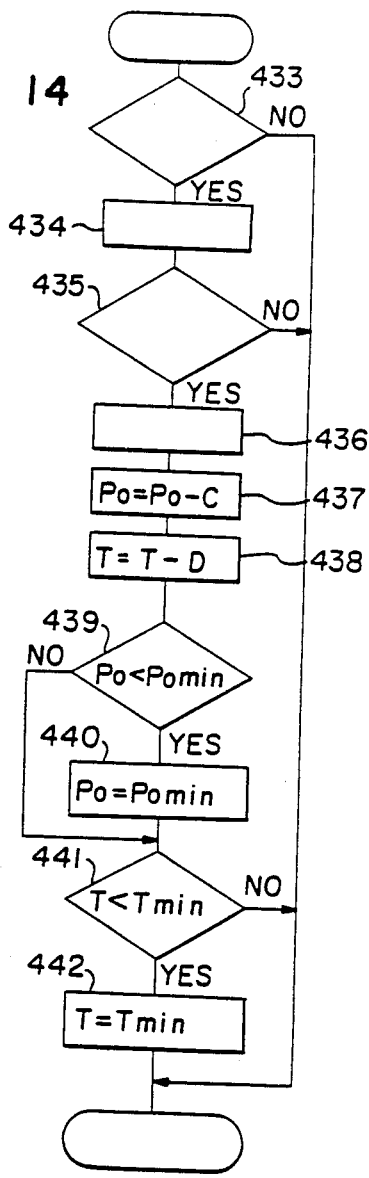

The operation in room-warming of the fourth embodiment will be described with reference to FIGS. 13 to 15. Description concerning use of the microcomputer and method of controlling the dampers 404 is omitted.

At Step 417, an established temperature $T_o$ and an actual temperature $T_R$ for each room are respectively input to the heat load measuring means 408 from the respective room thermostat 407, and operational sequence goes to Step 418 and Step 419.

At Step 418, the degree of opening of each of dampers 404 is determined, and at Step 419, an output for controlling the dampers 404 is provided. In this case, if the actual room temperature $T_R$ is equal to the established temperature $T_o$, change in the degree of opening of the dampers 404 is not carried out. If the actual temperature $T_R$ is lower than the established temperature $T_o$, the damper control means 409 controls the dampers 404 to move them in the opening direction. Contrary, if the actual temperature $T_R$ is higher than the established temperature $T_o$, the damper control means 409 controls the dampers 404 to moves them in the closing direction.

At Steps 420–422, the values of the established pressure and the established temperature in the air duct 403 are determined. In this case, when the temperature of any one of the rooms does not reach the established temperature within a predetermined time, the established pressure is raised to increase the quantity of air to be supplied, and at the same time the established temperature is also raised to increase the temperature of air, whereby the capacity of room warming is made large.

In contrast with this, when room-warming performance is excessively large, e.g. the situation that all the dampers 404 for the rooms which are air-conditioned are throttled continues for a predetermined time, the values of the established pressure and the established temperature are reduced to decrease the performance of the air conditioning apparatus.

At Step 420, determination is made as to whether the first room is air-conditioned or not. If the result of the determination is "YES", then the operational sequence goes to Step 421 at which determination is made as to whether the dampers 404 are entirely opened. If the dampers are entirely opened, the operational sequence goes to Step 422 at which determination is made as to whether the current room temperature which has been measured at Step 417 is lower than the established room temperature. If the current room temperature is low, then Step 423 is taken. At Step 423, summing of time for each rooms is carried out, and at the next Step 424, determination is made as to whether the summed time for each room exceeds 30 minutes. If the summed time exceeds 30 minutes, the summed time is cleared at the next Step 425, and the value of the established pressure is changed at Step 426. Namely, the established pressure $P_o$ which was automatically set at the time of starting the operation is changed to the value of $P_o+A$.

Similarly, the value of established temperature is changed at Step 427. Namely, the established temperature T which was automatically set at the time of starting the operation is changed to the value of $T+B$. In this case, the values of A and B are respectively a constant.

At Steps 428 and 429, determination is made as to whether the established pressure exceeds the established upper limit pressure. If the former exceeds the later, then, $P_o=P_{max}$ is established. Similarly, if the established temperature exceeds the established upper limit temperature at Steps 430 and 431, then, $T=T_{max}$ is established.

If the determination of "NO" is made at any one of the Steps 420, 421, 422 and 424, the operational sequence goes to Step 432. At Step 432, determination is made as to whether calculation of time has been finished for each of the rooms. If the calculation for each of the rooms is not finished, the operational sequence is returned to Step 420, and calculation of the subsequent room is carried out. When the calculation is finished for all the rooms, then the subsequent Step 433 is taken (FIG. 14). At Step 433, determination is made as to whether or not there are one or more dampers 404 entirely opened. If there is no damper which is entirely opened, time is summed at Step 434. At the subsequent Step 435, determination is made as to whether the summed time exceeds 30 minutes. If the summed time exceeds 30 minutes, the count is cleared, and the value of established pressure is changed to the value of $P_o-C$ at the next Step 437.

At the same time, the value of the established temperature is changed to the value of $T-D$ at Step 438. The values of C and D are respectively a constant.

At Step 439, determination is made as to whether the established pressure is lower than the established lower limit pressure. If the established pressure is low, $P_o=P_{min}$ is established (Step 440).

Similarly, determination is made as to whether or not the established temperature is lower than the established lower limit temperature at Step 441. If the established temperature is low, then, $T=T_{min}$ is established (Step 442).

Figure 15:
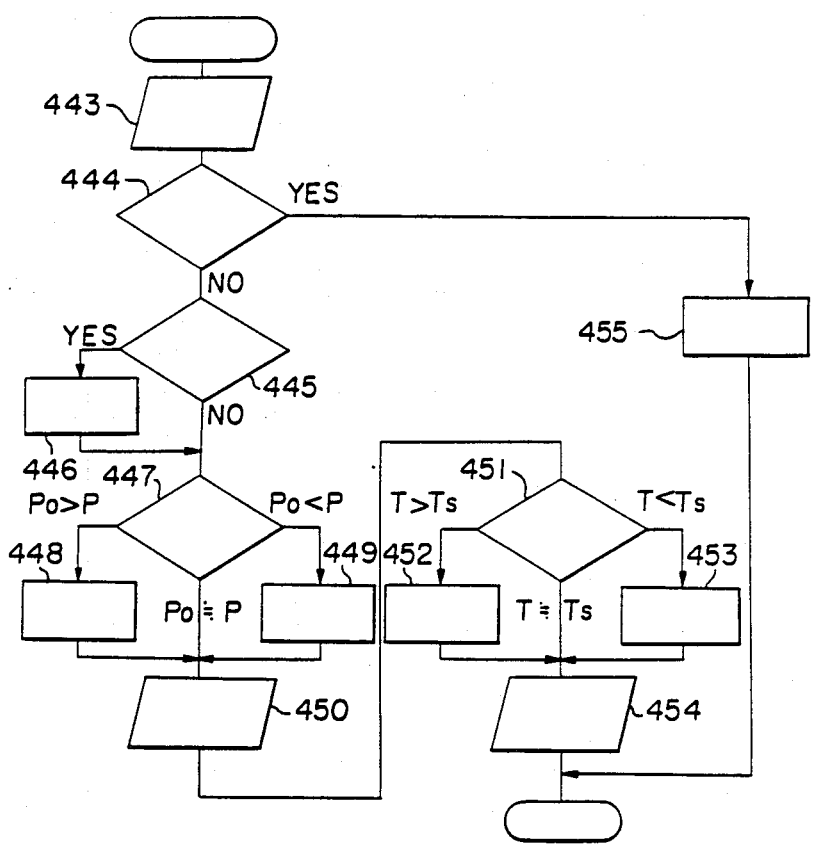

At Step 443 as shown in FIG. 15, the signals from the pressure detector 405 and the temperature detector 406 are input in the pressure-temperature measuring means 412, whereby the current pressure P and temperature $T_s$ in the air duct 403 are measured.

At Step 444, determination is made as to whether each of the dampers 404 is entirely closed or it is in nearly closed condition which exceeds the limit of operational capacity. If they are not in the entirely closure state, the operational sequence goes to Step 445 at which determination is made as to the heat source apparatus 401 is actually operated. If operated, the next Step 427 is taken. If the operation of the heat source apparatus 401 is stopped, the heat source apparatus 401 and the blower 402 are actuated at Step 446, and the next step 447 is taken.

At Step 447, the established pressure $P_o$ is compared with the pressure P in the air duct 403. If $P_o>P$, the revolution of air-blower 402 is increased depending on the difference between $P_o$ and P (Step 448). If $P<P_o$, the revolution of the air blower 402 is decreased (Step 449). If the actual pressure P is within a non-sensing region of the established pressure $P_o$, the revolution of the air blower 402 is not changed, and the operational sequence goes to Step 450 at which the revolution of the air blower 402 is controlled by a controller such as a thyristor.

At Step 451, the established-temperature T is compared with the actual temperature $T_s$. If $T>T_s$, the capacity of the heat source apparatus 401 (the revolution of a compressor when a heat pump is used as the heat source apparatus 401) is increased depending on the difference between T and $T_s$ (Step 452).

On the contrary, if the established temperature T is lower than the actual temperature $T_s$, the revolution of the heat source apparatus 401 is decreased. If the established temperature T is within a non-sensing region of the actual temperature $T_s$, the revolution is not changed and the subsequent Step 454 is taken. At Step 454, the revolution of the heat source apparatus 401 is controlled by a controller such as an inverter. When each of the dampers 404 is so determined that they are entirely opened at Step 444, the operational sequence goes to Step 455 at which the air blower 402 and the heat source apparatus 401 are stopped.

The control as above-mentioned is repeated at a fixed time interval.

In case that there exists two rooms whose room temperature do not reach the established temperature within a predetermined time, e.g. within 30 minutes even though the dampers 404 are entirely opened, Steps 426 and 427 are twice taken, and the established pressure $P_o$ is changed to $P_o+2A$ and the established temperature T is changed to $T+2B$.

Further, in case that there is one or more rooms whose temperature do not reach the established temperature in the time from 30 minutes to 60 minutes, the values of the established pressure $P_o$ and the established temperature T are further changed.

During a series of controlling operations, when the room temperature of a specified room or a plurality of room are fairly lower than the established room temperature, the values of the established pressure and the established temperature are changed to be a higher value. As a result, a large quantity of air having a higher temperature is supplied to the room having the greatest heat load, whereby the room temperature is rapidly increased.

On the other hand, the damper 404 of the room whose room temperature is kept in a satisfactory condition is throttled, whereby a suitable quantity of warm air is supplied.

When he room temperature of each of the rooms reaches the established room temperature and the value of the greatest heat load becomes small, each of the dampers 404 is throttled, whereby the established pressure and the established temperature are decreased so that the quantity of air and the temperature of air are reduced.

When the room temperature decreases due to reduction in the quantity and the temperature of the air, each of the dampers 404 is moved to be entirely opened, and operation is carried out under a low established pressure and at a low established temperature. Accordingly, the air blower 402 is operated at a small pressure loss, and power to be supplied to the air blower 102 is reduced.

In the fourth embodiment, although the values of A, B, C and D are respectively a constant for the established pressure and the established temperature, these values may be respectively a variable which is in proportion to the outer temperature.

In the above-mentioned embodiment, explanation has been made in such a manner that structural elements from the established temperature determining means 410 to the heat source apparatus control means 416 are operated in the order as shown in FIG. 12. However, the structural elements may be arranged in the order of the pressure-temperature measuring means 412, the established temperature determining means 411, the established pressure determining means 410, the capacity determining means 415, the heat source control means 416, the air blowing quantity determining means 413 and the air blower control means 414 since the operation time executed by each of the elements is short.

The quantity of air from the air blower 402 and the capacity of the heat source apparatus 401 may be controlled by other control means instead of the thyristor and the inverter.

In the fourth embodiment, although the summed time is determined to be 30 minutes at Steps 424 and 435, an optimum time may be established depending on the capacity of the heat source apparatus 401 and the area of room to be air-conditioned.

In the fourth embodiment of the present invention, the established pressure and the established temperature in the air duct are determined depending on the value of the heat load, and a suitable quantity of air and a suitable temperature of the air can be supplied to each of the rooms on the basis of the determination. Accordingly, the room temperature can be correctly controlled with respect to the established temperature even when the heat load is large, and the air blower can be operated with a small power when the heat load is small.

FIGS. 16 to 19 show a fifth embodiment of the present invention.

The construction of the air conditioning apparatus according to the fifth embodiment will be described with reference to FIG. 16. The air conditioning apparatus comprises a capacity changeable type heat source apparatus 501 for producing warm air or cool air, an air blower 502 for feeding the warm air or cool air from the heat source apparatus at a substantially constant pressure, a main duct 503 connected to the outlet port of the air blower, an air quantity adjusting damper 504 disposed in each branch duct which is connected to the air duct 503, a temperature detector 505 placed in the air duct 503 to detect the temperature of the warm air or cool air and a room thermostat 501 attached to each of rooms The air conditioning apparatus is further constructed in such a manner that a detection signal from each of the room thermostats 506 is input in a heat load measuring means 507 in which the value of a heat load in each room is measured; and output form the heat load measuring means 507 is input in a damper control means 508, whereby the degree of opening of each of the dampers 504 is controlled based on the output of the damper control means 508; outputs from the damper control means 508 and the heat load measuring means 507 are input in an established temperature determining means 509 to determine the value of air in the air duct 503; the value determined by the established temperature determining means 509 and an output from the temperature detector 505 are received in a temperature measuring means 510; an output from the temperature measuring means 510 is input in a capacity determining means 511 to determine the capacity of the heat source apparatus 501; and a heat source apparatus control means 512 controls the capacity of the heat source apparatus 501 in accordance with an output from the capacity determining means 511.

Figure 17:
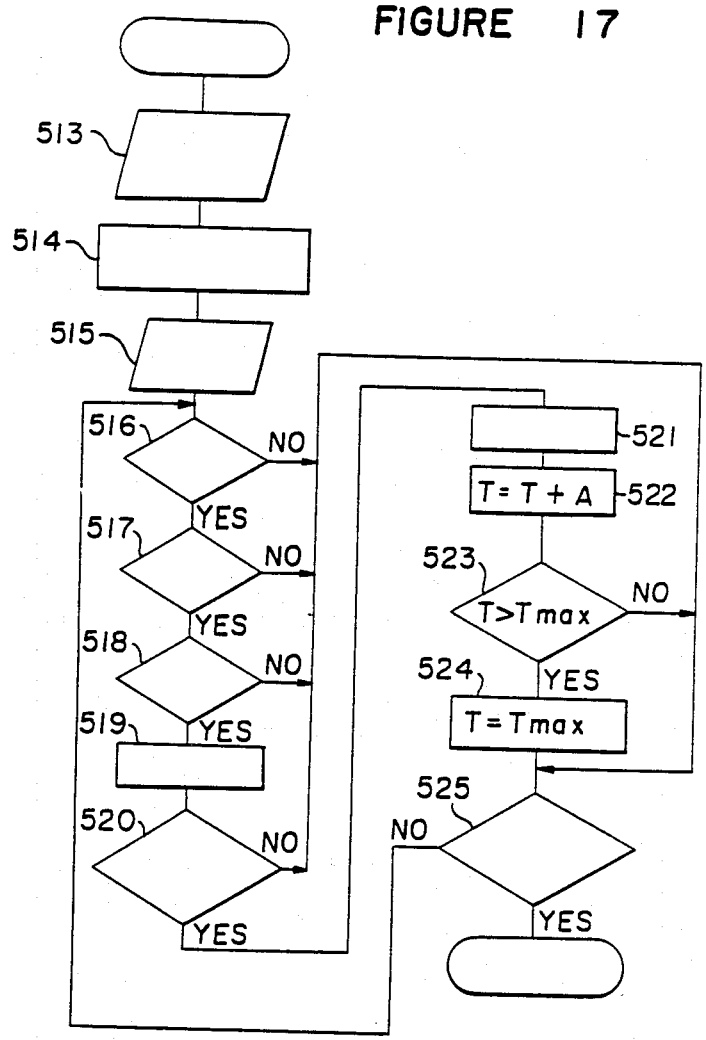
FIGS. 17 to 19 are respectively flow charts for explaining the operations of the fifth embodiment.
Figure 18:
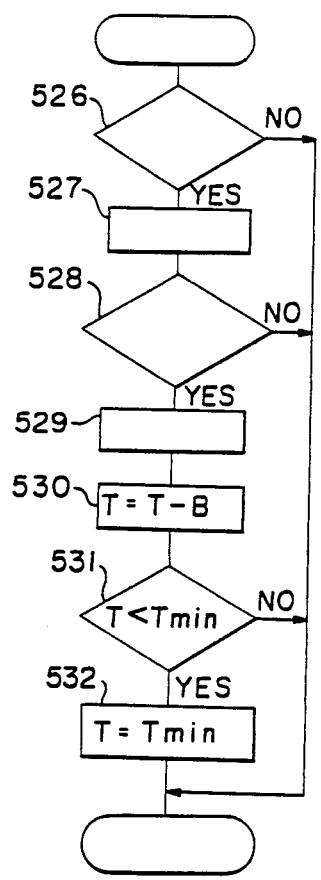
Figure 19:
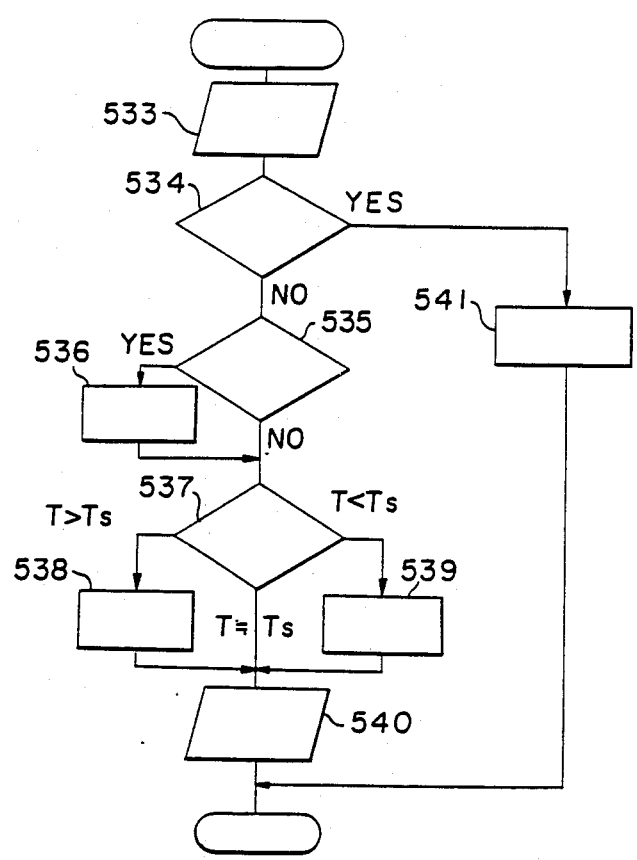

In the following, the operation of the fifth embodiment will be described with reference to FIGS. 17 to 19 showing room-warming operation. Although it is desirable to control the apparatus by using a microcomputer, the detail of the circuit is omitted. Further, description concerning the control of the degree of opening of the dampers 504 to regulate the quantity of air in conformity with a heat load is also omitted.

At Step 513, signals indicative of the values of an established temperature $T_o$ and an actual room temperature $T_R$ from the room thermostat 506 for each of the room are input in the heat load measuring means 507.

At Step 514, if the actual temperature is equal to the established temperature, change of the degree of opening of the dampers 504 is not performed. If the actual room temperature $T_R$ is lower than the established temperature $T_o$, the damper control means 509 controls the dampers 504 to move them in the opening direction. Contrary, if the room temperature $T_R$ is higher than the established temperature $T_o$, the dampers are controlled by the damper control means 509 so that they are moved in the closing direction (Step 515).

In the next place, determination of the established temperature of the air in the air duct 503 is executed at Steps 516 to 532. In these Steps, when the room temperature in any one of the room does not reach the established temperature within a predetermined time, the established temperature is increased to increase the temperature of the air to be supplied, whereby the ability of room-warming operation of the apparatus is increased.

On the other hand, when the condition in which all the dampers 504 are throttled continues for a predetermined time (the ability of room-warming operation is too large), the established temperature is reduced to reduce the ability.

The function as above-mentioned will be described in more detail.

At Step 516, determination is made as to whether or not the first room is air-conditioned. If the result of determination is "YES", Step 517 is taken. Then, determination is made as to whether the dampers 514 are entirely opened or not. If entirely opened, the operational sequence goes to Step 518 at which the current room temperature of the first room which has been measured at the previous Step 513 is lower than the established room temperature. If the room temperature is low, the operation is forwarded to Step 519. At Step 519, time is summed up for each of rooms, and at Step 520, determination is made as to whether the sum total time continues 30 minutes or more for each of the rooms. If the summed time exceeds 30 minutes, the summed time is cleared at Step 521, and the established temperature is changed at the next Step 522. Namely, the established temperature T which has been automatically set at the time of starting the operation is changed to the value of T+A, where the value of A is a constant.

At Steps 523 and 524, determination is made as to the established temperature is higher than the established upper-limit temperature $T_{max}$. If the established temperature is high, then, $T=T_{max}$ is established.

When the result of determination is given "NO" at any one of the Steps 516, 517, 518 and 520, the operational sequence goes to Step 525. At Step 525, determination is made as to whether calculation has been finished for each of the rooms. If the calculation is not finished, the operational sequence is returned to Step 516, and calculation for the next room is carried out. The calculation of all the rooms is finished, the next Step 526 (FIG. 18) is taken. At Step 526, determination is made as to whether at least one damper 504 is entirely opened. If no entirely opened damper is found, time is summed up at Step 527. At Step 528, determination is made as to whether the summed time continues more than 30 minutes. If the summed time exceeds 30 minutes, the summed time is cleared at Step 529, and the established temperature is changed to the value of T−B, where the value of B is a constant.

At Steps 531 and 532, determination is made as to whether the established temperature is lower than the established lower limit temperature $T_{min}$. If the established temperature is low, $T=T_{min}$ is established.

At Step 533 shown in FIG. 19, a signal from the temperature detector 505 is input whereby the actual temperature $T_s$ in the air duct 503 is measured.

At Step 534, determination is made as to whether each of the dampers 504 is entirely closed for it is nearly closed, state which exceeds the limit of operational capacity. If the condition that at least one damper 504 is opened is found, determination is made as to whether or not the heat source apparatus 501 is operated at Step 535. If the heat source apparatus is operated, then next Step 537 is taken. If the heat source apparatus is stopped, it is actuated, and the operational sequence goes to Steps 536 and 537.

At the next Step 537, the value of the established temperature T is compared with the value of the actual temperature $T_s$. If $T>T_s$, the capacity of the heat source apparatus 501 (the revolution of a compressor when a heat pump is used for the heat source apparatus 501) is increased depending on the difference between T and $T_s$ (Step 538). If $T<T_s$, the capacity of the heat source apparatus 501 is decreased (Step 539). If the established temperature T is within a non-sensitive region of the actual temperature $T_s$, the revolution of the apparatus is not changed, and the operational sequence goes to the next Step 540 at which the revolution of the heat source apparatus 501 is controlled by a controller such as an inverter.

When it is found that each of the dampers 504 is entirely closed at Step 534, then Step 541 is taken to stop the heat source apparatus 501.

The control sequence as described above is repeated at a fixed time interval.

If two rooms do not simultaneously reach a predetermined room temperature for a specified time, namely, they do not reach the established temperature within 30 minutes under their dampers entirely opened, Step 522 is taken once more. As a result, the established temperature is changed to the value of T+2A. In the case that there is any room whose room temperature does not reach the established temperature in the time from 30 minutes to 60 minutes, the value of T is further modified.

During a series of control as above-mentioned, the room temperature of a specified room or a plurality of rooms are remarkably lower than the established room temperature, the value of the temperature is established high, whereby air of an elevated temperature is supplied to the room having the greatest heat load to increase the room temperature rapidly. On the other hand, the dampers for the rooms in which the room temperature is kept in satisfactory condition are throttled, whereby an optimum quantity of warm air is supplied to each of the rooms.

When the room temperature of all the rooms reaches the established temperature, and the value of the greatest heat load becomes small, the dampers 504 are throttled. As a result, the established temperature is reduced and the temperature of the air is reduced. Reduction of the room temperature due to the reduced established temperature operates each of the dampers 504 to be opened, and finally the air-conditioning apparatus is operated at a low established temperature and with the dampers 504 which are adjusted to be in nearly entirely opened condition. Accordingly, the air blower 502 is operated at small pressure loss, and power for the air blower 502 can be small.

In the fifth embodiment, the values A, B for-changing the established temperature may be variables in proportion to the outer temperature instead of constants.

Figure 16:
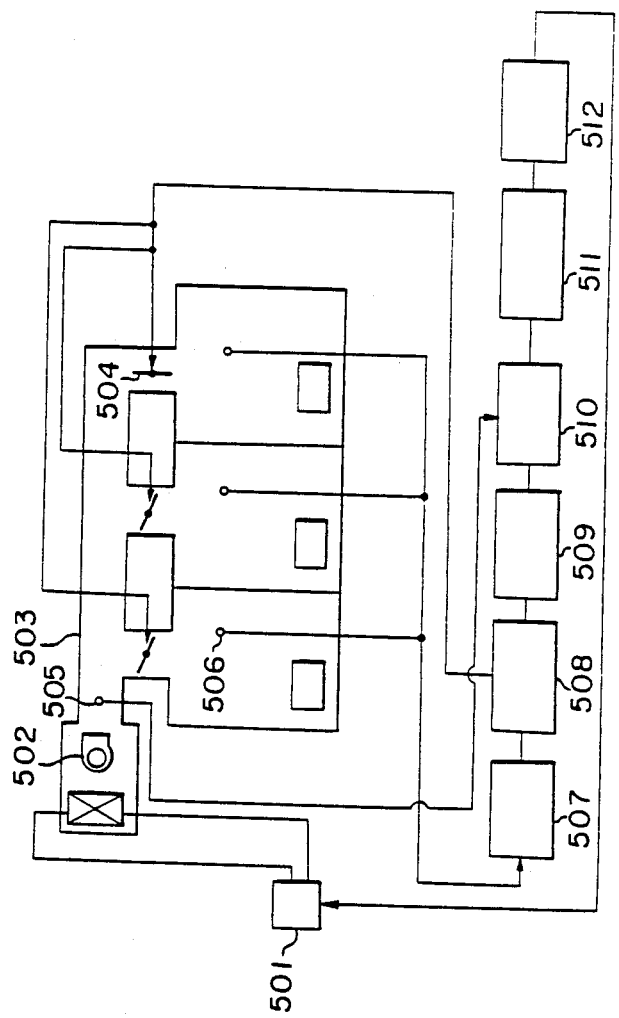
FIG. 16 is a diagram showing the construction of a fifth embodiment of the present invention.

In the fifth embodiment, although the arrangement from the established temperature determining means 509 to the heat source apparatus control means 512 is determined in the order as shown in FIG. 16, they may be rearranged in the order of the temperature measuring means 510, the established temperature determining means 509, the capacity determining means 511 and the heat source apparatus control means 512 since the operation time of each of the means is short.

In the above-mentioned embodiment, control of the capacity of the heat source apparatus 501 may be made by another control means instead of the inverter for controlling the revolution of the heat source apparatus 501.

Further, determination of the summed time to be executed at Steps 520, 528 may be a desired value other than 30 minutes depending on the capacity of the heat source apparatus 501 and a surface area of a room to be air-conditioned.

Thus, the fifth embodiment is so constructed that the established temperature in the air duct is determined depending on the value of the heat load, and warm air or cool air which is adjusted at an optimum temperature can be supplied to each of the rooms in accordance with the determination. Accordingly, the room temperature can be correctly controlled with respect to the established temperature when the value of the heat load is large, and the air blower is operated with a small power when the heat load is small.

In the following, a sixth embodiment of the air-conditioning apparatus of the present invention will be described with reference to the drawings.

Figure 20:
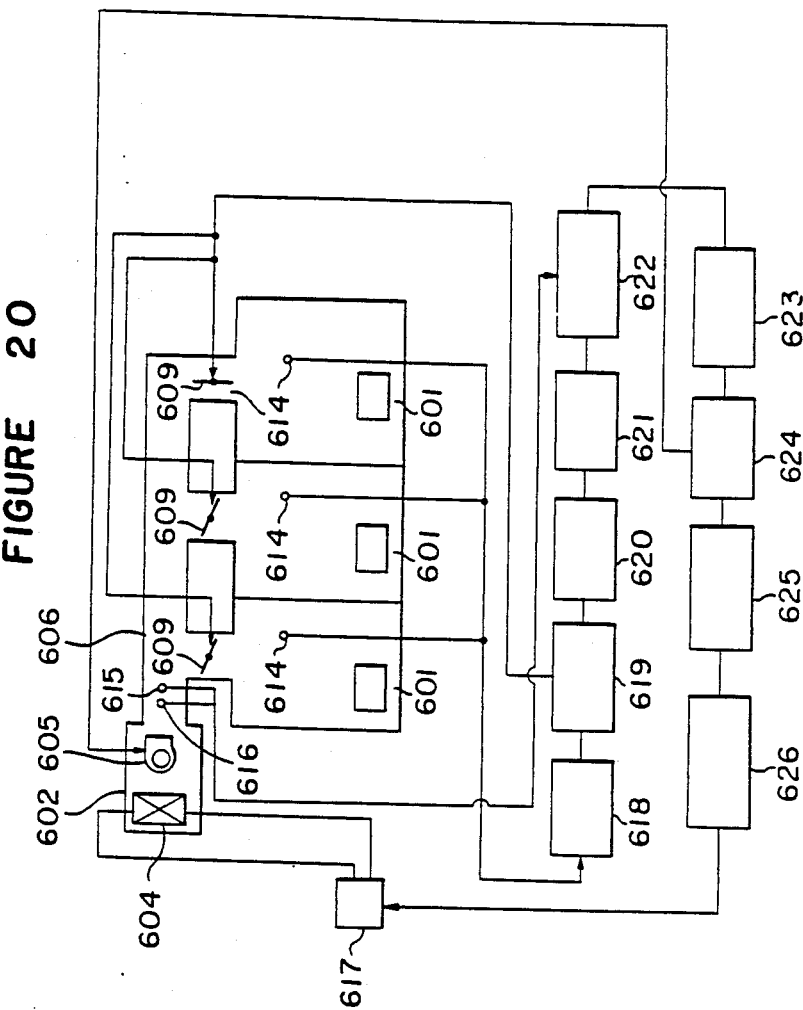
FIG. 20 is a diagram showing the construction of a sixth embodiment of the present invention.

In FIG. 20, the air-conditioning apparatus comprises a heat exchanger 604 placed in a room unit 602, a capacity changeable type heat source apparatus 617 connected to the heat exchanger 604 to produce warm air or cool air, a capacity changeable type air blower 605 for supplying the cool air or the warm air from the heat source apparatus 617 and the heat exchanger 604, an air duct 606 connected to the outlet port of the air blower 605, a plurality of branch ducts which connect the air duct 606 to each of the rooms, a damper 609 disposed in each of the branch duct to regulate the quantity of air, a pressure detector 616 disposed in the air duct 606 to detect a pressure, a temperature detector 615 disposed in the air duct 606 to detect temperature and a room thermostat 614 attached to each of the rooms.

A detection signal of each of the thermostats 614 is input in a heat load measuring means 618 in which the value of a heat load for each of the rooms is measured from the difference between an established temperature and an actual temperature. A-damper control means 619 controls the degree of opening of each of the dampers 609 on the basis of the output of the heat load measuring means. Also, the heat load measuring means 618 measures the sum total of the heat loads of the rooms. A signal indicative of the sum total is input in an established pressure determining means 620 to determine the pressure of the air in the air duct 609. Similarly, an established temperature determining means 621 receives the signal from the heat load measuring means 618 to determine the temperature of the air in the main duct 609. A pressure-temperature measuring means 622 receives signals from the established pressure determining means 620 and the established temperature determining means 621 as well as detection signals from the pressure detector 616 and the temperature detector 615, and outputs a signal into an air blowing quantity determining means 623 and a capacity determining means 625. An air blower control means 624 receives a signal from the air blowing quantity determining means 623 to control the capacity of the air blower 605, and a heat source apparatus control means 626 receives a signal from the capacity determining means 625 to control the capacity of the heat source apparatus 617.

Figure 22:
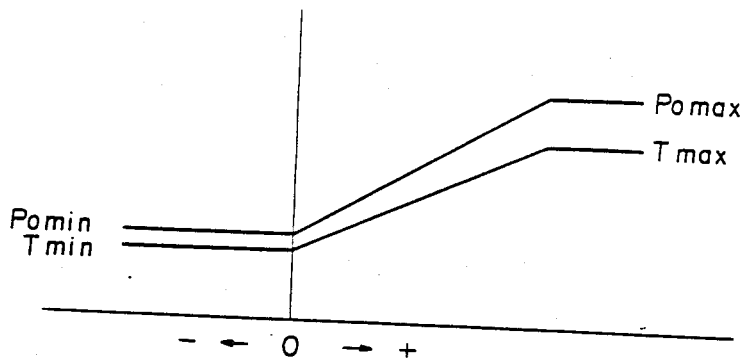
FIG. 22 is a diagram showing a relation of the sum of heat loads to each established value.
Figure 21:
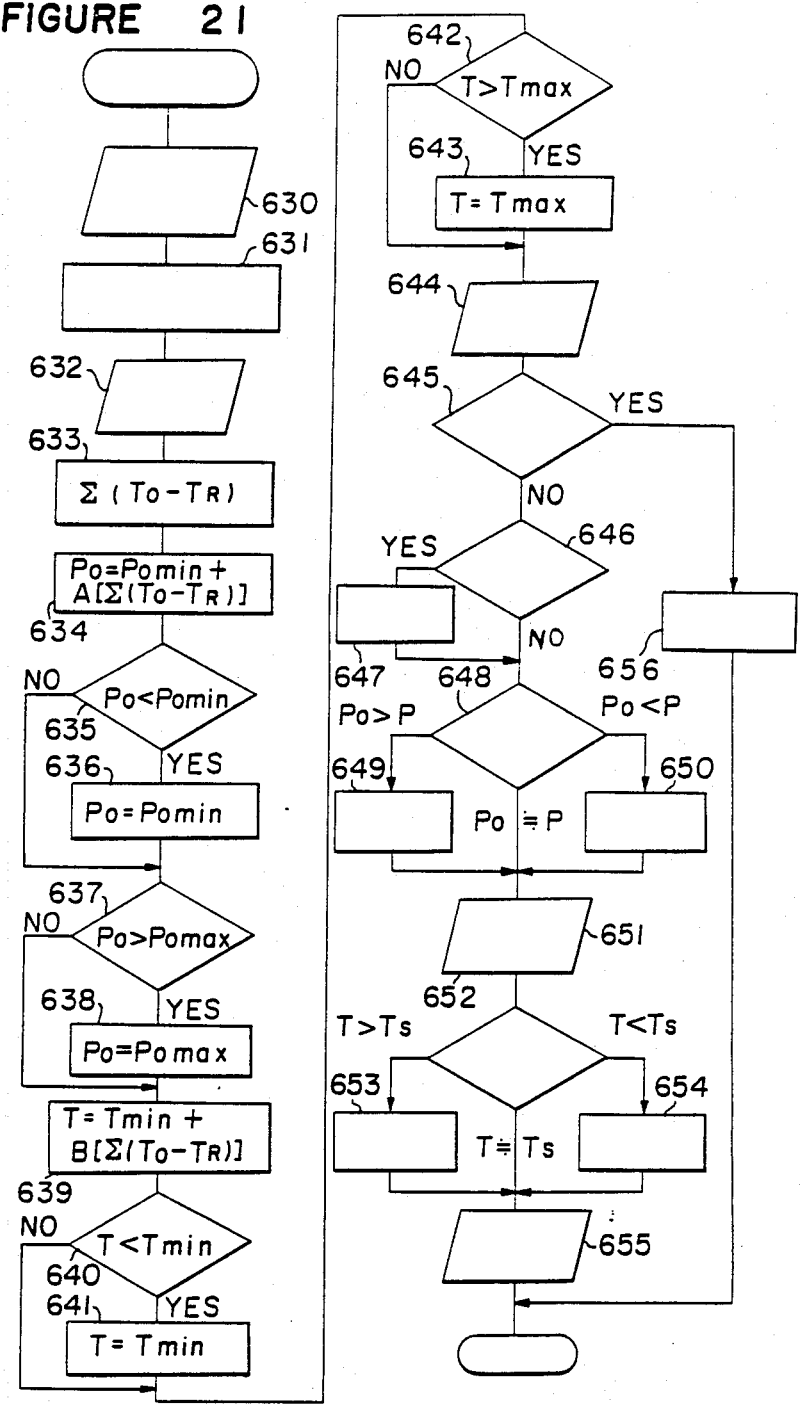
FIG. 21 is a flow chart for explaining the controlled operations of the sixth embodiment.

The operation in the room-warming mode of the sixth embodiment will be described with reference to FIG. 21 showing the flow chart of a control program and FIG. 22 showing the relation between heat load and established pressure and temperature.

Description of the circuit diagram of a microcomputer used for carrying out the control program is omitted. The detail of controlling the degree of opening of dampers 609 for regulating the quantity of air in conformity with the heat load is also omitted.

When an instruction of room-warming operation mode is given to the air-conditioning apparatus, the control problem as in FIG. 21 is started. At Step 630, each value of an established temperature $T_o$ and the current room temperature $T_R$ is input from the room thermostat 614 attached to each of the rooms to the heat load measuring means 618. Based on an output from the heat load measuring means 618, the degree of opening of each damper 609 is determined at Step 631. At Step 632, each of the dampers is controlled in such a manner that if the room temperature is equal to the established temperature, the degree of opening of the dampers is not changed; if the room temperature is low, the dampers 609 are moved in the opening direction; and if the room temperature is high, they are moved in the closing direction.

At Step 633, the value of the sum (the total heat load) of the values obtained by the difference between the established temperature and the actual room temperature for each of the rooms is found. In this case, the heat load for the room(s) in which room-warming operation is stopped by a manual switch is not considered. In determination of the summed heat load, a value given the room temperature is higher than the established temperature may be considered as a negative heat load.

At Step 634, calculation of $P_o = P_{o\,min} + A[\Sigma(T_o - T_R)]$ is carried out to obtain $P_o$, where $P_o$ is an established pressure, $P_{o\,min}$ is an established lower limit pressure (a constant) which allows a stable operation of the air conditioning apparatus and A is a constant.

At Step 635, determination is made as to whether or not the value of the established pressure is lower than the established lower limit pressure ($P_{o\,min}$). If the established pressure is low, $P_o = P_{min}$ is established at Step 636.

Similarly, determination is made whether or not the established pressure is higher than the established upper limit pressure $P_{o\,max}$ at Step 637. If the established pressure is high, $P_o = P_{o\,max}$ is established at Step 638.

At Step 639, calculation of $T = T_{min} + B[\Sigma(T_o - T_R)]$ is carried out to obtain T, where T is an established temperature, $T_{min}$ is an established lower limit temperature (a constant) which is determined in consideration of the characteristics of the heat source apparatus 617, and B is a constant.

At Step 640, determination is made as to whether the value of the established temperature is lower than the established lower limit temperature $T_{min}$. If the established temperature is low, $T = T_{min}$ is established at Step 641.

In the same manner, determination is made as to whether the established temperature is higher than the established upper limit temperature $T_{max}$ at Step 642. If the established temperature is high, $T = T_{max}$ is established at Step 643.

At Step 644, the signals from the pressure detector 616 and the temperature detector 615 are input, and the current pressure P and temperature $T_s$ in the air duct 606 are measured.

At Step 645, determination is made whether each of the dampers 609 is entirely closed or is in a nearly entirely closed state which is beyond the critical operation of the air-conditioning apparatus. If the dampers 609 are not in entirely or nearly closed state, the operational sequence goes to the next Step 646 at which determination is made as to whether the heat source apparatus 617 is operated. If the heat source apparatus is operated, Step 648 is taken. If the apparatus is stopped, the heat source apparatus 617 and the blower 605 are operated (Step 647), and Step 648 is taken.

At Step 648, the value of the pressure P in the air duct 606 is compared with the value of the established pressure $P_o$. If $P_o > P$, the capacity of the air blower is increased depending on the pressure between P and $P_o$ (Step 649). If $P < P_o$, the capacity of the air blower is decreased (Step 650). If the pressure P is within a non-sensitive zone of the established pressure $P_o$, the revolution of the air blower is not changed, and the operational sequence goes to Step 651 at which the revolution of the air blower 605 is controlled by a controller such as a thyristor.

At Step 652, the value of the established temperature T is compared with the actual temperature $T_s$. If $T > T_s$, the capacity of the heat source apparatus 617 (the revolution of a compressor when a heat pump is used as the heat source apparatus 617) is increased depending on the difference between T and $T_s$ (Step 653). If $T < T_s$, the capacity is decreased (Step 654). If the established temperature T is within a non-sensitive zone of the temperature $T_s$, the revolution of the heat source apparatus is not changed, and the operational sequence goes to the Step 655 at-which the revolution of the heat source apparatus 617 is controlled by a controller such as an inverter.

When the condition that all dampers 609 are entirely closed is satisfied at Step 645, the operation is forwarded to Step 656 at which the air blower 605 and the heat source apparatus 617 are stopped.

The control as above-mentioned is repeated at a fixed time interval. During a series of control operations, when the s? m total of the heat loads of the rooms is large, the values of the established pressure and the established temperature are determined high and at the same time, the degree of the opening of the dampers 609 is in proportion to the values of the heat load. Accordingly, the damper 609 in the room having a large heat load is brought to a substantially entirely opened state. As a result, a large quantity of air having an elevated temperature is supplied to the room having a large heat load, whereby the room temperature is rapidly increased. On the other hand, the dampers 609 in the rooms in which the room temperature is in satisfactory condition are throttled, whereby a suitable quantity of warm air is supplied to the rooms. When the sum of the heat loads is small, the established pressure and the established temperature are reduced, whereby the quantity of the air and the temperature of the air are decreased. The reduction in the quantity and the temperature of the air causes reduction in the room temperature, and each of the dampers 609 is moved in the opening direction. Finally, the air conditioning apparatus operates at low established pressure and established temperature and under the condition that the dampers are in nearly entirely opened state. Accordingly, the air blower 605 is operated at a small pressure loss, and power for the air blower is reduced.

When the heat pump is used as the heat source apparatus 617, it is impossible to control the capacity of the heat pump in a wide range, and therefore, an ON/OFF control system is used under a certain load or lower. In a low heat load operation, it is possible to reduce the number of ON/OFF operations of the heat pump because the established temperature is decreased under the low heat load condition.

In the sixth embodiment, the values of A, B for changing the values of the established pressure and the established temperature may be variables which are in proportion to the outer temperature although the values of A, B are respectively a constant.

In the above-mentioned embodiment, the structural elements are arranged in the order as shown in FIG. 20, namely, in the order from the established pressure determining means 620 to the heat source apparatus control means 626. However, the structural elements may be arranged in the order of the temperature measuring means 622, the established-pressure determining means 620, the air blowing quantity determining means 623, the air blower control means 624, the established temperature determining means 621, the capacity determining means 625 and the heat source apparatus control means 626 because time of execution in each of the means is short.

The air blower 605 and the heat source apparatus 617 may be controlled by other control means instead of the thyristor and the inverter.

In the sixth embodiment, a separate type heat pump is used as the heat source apparatus 617. However, another heat pump apparatus such as an integral type heat pump, a gas furnace, a fan coil unit and so on may be used.

As described above, in the sixth embodiment of the present invention, the dampers are automatically controlled; the established pressure and the established temperature in the air duct are established on the basis of the summed heat load and suitable quantity and temperature of the air can be supplied to each of the rooms on the basis of the determination. Accordingly, the room temperature can be correctly controlled with respect to the established value when the heat load is large, and the air blower can be operated at a small power when the heat load is small.

In the following, a seventh embodiment of the present invention will be described with reference to the drawings.

Figure 23:
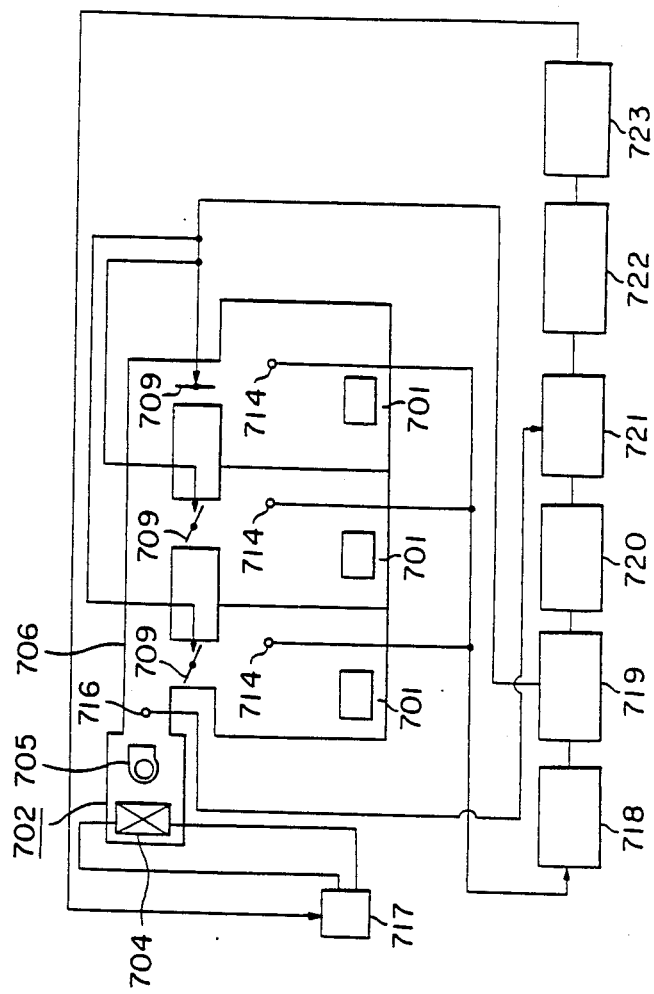
FIG. 23 is a diagram showing the construction of a seventh embodiment of the present invention.

Referring to FIG. 23, the air conditioning apparatus comprises a heat exchanger 704 placed in a room unit 702, a heat source apparatus 717 connected to the heat exchanger 704 to produce warm air or cool air, a capacity changeable type air blower 705 for feeding the warm air or cool air from the heat exchanger 704 and the heat source apparatus 717, an air duct 706 connected to the outlet port of the air blower 705, an air quantity adjusting damper 709 disposed in each of branch ducts which are connected to the air duct 706, a pressure detector 716 placed in the air duct 706 to detect the pressure of the air and a room thermostat 714 attached to each of the rooms. The air conditioning apparatus is further so constructed that a detection signal from each of the room thermostats 714 is input in a heat load measuring means 718, whereby the value of a heat load in each room is measured; a damper control means 719 receives an output from the heat load determining means 718 to control the degree of opening of each of the dampers 709; an established pressure determining means 720 determines the pressure of the air in the air duct 706 on the basis of the sum total of the heat loads of the rooms which are measured by the heat load measuring means 718; a signal as a result of determination in the established pressure determining means 720 and a detection signal from the pressure detector 716 are input in a pressure measuring means 721; an air blowing quantity determining means 722 determines the capacity of the air blower 705 in accordance with an output from the pressure measuring means 721, and an air blower control means 723 controls the capacity f the air blower 705 in accordance with an output from the air blowing quantity determining means 722.

Figure 24:
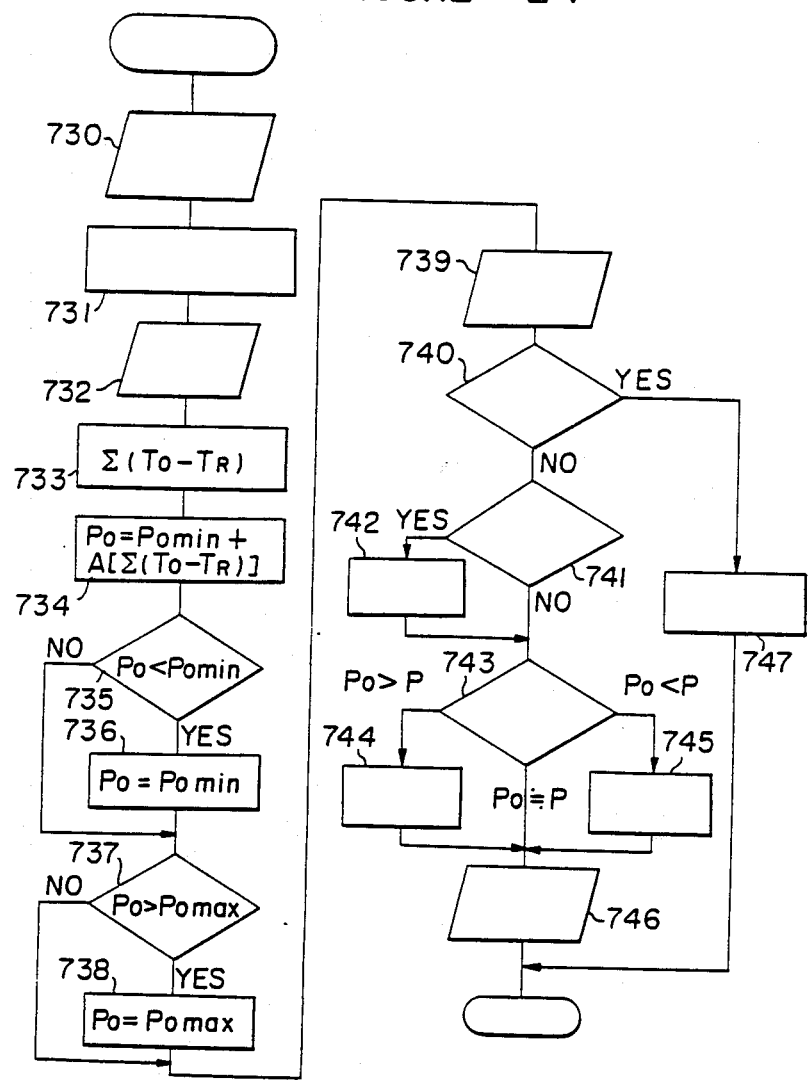
FIG. 24 is a flow chart for explaining the controlled operations of the seventh embodiment.
Figure 25:
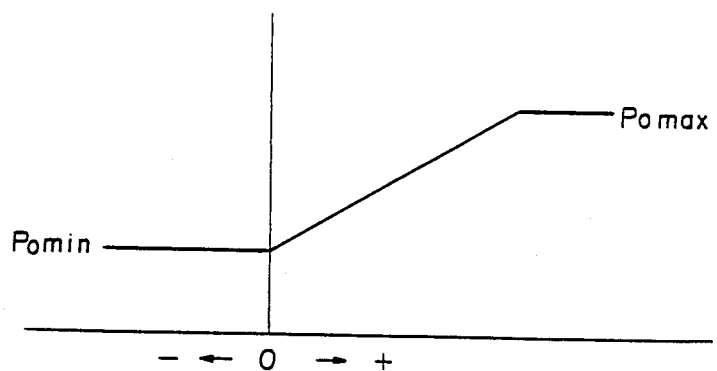
FIG. 25 is a diagram showing a relation of the sum of heat loads and an established value.

The operation for room-warming of the seventh embodiment 11 be described with reference to FIG. 24 showing the flow chart of a control program and FIG. 25 showing the relation between the summed heat load and an established pressure.

The control program is usually controlled by using a microcomputer. However, explanation of the circuit of the microcomputer is omitted. Explanation of controlling the degree of opening of the dampers 709 for regulating the quantity of air is also omitted.

When room-warming operation mode is given to the air conditioning apparatus, a control program as shown in FIG. 24 is started.

At Step 730, the values of an established temperature $T_o$ and the current room temperature $T_R$ are input to the heat load measuring means 718 from the room thermostat 714 in each of the rooms. At Step 731, the degree of opening of each of the dampers is determined on the basis of the values. In this case, if the room temperature is equal to the established temperature, change of the degree of opening the dampers 709 is not carried out. If the room temperature is lower than the established temperature, the dampers 709 are moved in the opening direction. Contrary, if the room temperature is high, the dampers 709 are moved in the closing direction (Step 732).

At Step 733, the sum of the values each of which is obtained by subtracting the actual temperature from the established room temperature in each of the rooms which are previously measured, is found. The summed value is referred as the sum total heat load. In this case, the heat load of the room(s) for which room-warming operation is stopped by means of the switch of the room thermostat 714 is not considered. In obtaining the sum total heat load, when the room temperature is higher than the established temperature, the value of the difference may be considered as a negative heat load.

At Step 734, calculation of $P_o = P_{o\,min} + A[\Sigma(T_o + T_R)]$ is carried out to found $P_o$, where $P_o$ is an established pressure, $P_{o\,min}$ is an established lower limit pressure (a constant) which is determined within the range that air blower 705 can be stably operated and A is a constant. At Step 735, determination is made as to whether the value of the established pressure $P_o$ is lower than the established lower limit pressure $P_{o\,min}$. If the established pressure is low, $P_o = P_{o\,min}$ is established at Step 738. Similarly, determination is made as to whether the established pressure is higher than the established upper limit pressure $P_{o\,max}$ at Step 737. If the established pressure is high, $P_o = P_{o\,max}$ is established at Step 738.

At Step 739, the current pressure P in the air duct is measured on the basis of the signal of the pressure detector 716. At Step 740, determination is made as to whether each of the dampers 709 is entirely closed or it is nearly entirely closed state which exceeds the limit of operation of the air conditioning apparatus. If the dampers 709 are not entirely closed, the operational sequence goes to Step 741 at which determination is made as to whether the air blower 705 is operated. If the air blower 705 is stopped, it is actuated at Step 742, and the subsequent Step 743 is taken.

At Step 743, the value of the pressure P in the air duct is compared with the established pressure $P_o$. If $P_o > P$, the capacity of the air blower 705 is increased depending on the difference between P and $P_o$ (Step 744). If $P < P_o$, the capacity of the air blower 705 is decreased (Step 745). If the value of the pressure P is within a non-sensitive region of the established pressure $P_o$, the revolution of the air blower 705 is not changed, and the operational sequence goes to the next Step 746 at which control of the revolution of the air blower 705 is carried out by a controller such as a thyristor.

When the condition that all the dampers 709 is entirely closed is found at Step 740, the air blower 705 is stopped (Step 747).

The operation as above-mentioned is repeated at a fixed time interval. During the controlling operation, when the summed value of the heat loads of the rooms is large, the value of the established pressure is established high. Since the degree of opening of the dampers is in proportion to the value of the heat load, the damper 709 for the room having a large heat load is brought into an entirely opened state. As a result, a large quantity of warm air is supplied to the room having the large heat load thereby to increase the room temperature rapidly. On the other hand, the damper for the room in which the room temperature is kept at satisfactory condition is throttled, whereby a optimum amount of warm air is supplied to the room.

When the sum of the heat loads of the rooms is small, the value of the established pressure is decreased and the quantity of air to be supplied is reduced. When the room temperature is decreased depending on reduction in the quantity of the air, each of the dampers 709 is moved in the opening direction, and finally, the air conditioning apparatus is operated under the condition of a low established pressure and with the dampers 709 which are in a nearly entirely opened state. Accordingly, the air blower 305 is operated at a small power loss and a power for the air blower is decreased.

In the above-mentioned embodiment, the value of A for changing the established pressure is used as a constant. However, it may be a variable which varies in proportion to the outer temperature.

Although the seventh embodiment has an arrangement of the structural elements in the order from the established pressure determining means 720 to the air blower control means 723 as shown in FIG. 23, they may be arranged in the order of the pressure-measuring means 721, the established pressure determining means 720, the air blowing quantity determining means 722 and the air blower control means 723 because the time of operation in each means is short.

In the seventh embodiment, although the revolution of the air blower 705 is controlled by the thyristor to control the quantity of the air, the air blower 705 may be controlled by another means.

Further, a separate type heat pump is used as the heat source apparatus 717. However, another type of heat source apparatus such as integral type heat pump, a gas furnace, a fan coil unit may be used.

As described above, the seventh embodiment of the present invention is so constructed that the dampers are automatically controlled; the established pressure in the air duct is determined depending on the summed heat load, and an optimum quantity of air is supplied to each of the rooms on the basis of the determination. Accordingly, the room temperature can be correctly controlled with respect to the established value when the heat load is large, and the air blower can be operated at a small power when the load is small.

An eighth embodiment of the air conditioning apparatus according to the present invention will be described with reference to FIGS. 26 and 27.

FIG. 6 shows the construction of the air conditioning apparatus schematically.

The apparatus comprises a capacity changeable type heat source apparatus 817 for producing warm air or cool air, a capacity changeable type air blower 805 for feeding the warm air or cool air heat-exchanged in a heat exchanger 804 which is connected to the heat source apparatus 817 and which is placed in a room unit 802, an air duct 806 connected to the air blower 805, a damper 809 disposed in each of branch ducts 810 connected to the air duct 806 to regulate the quantity of air to be supplied, a pressure detector 816 disposed in the air duct 806 to detect a pressure, a temperature detector 815 disposed in the air duct 806 to detect temperature and a room thermostat 814 attached to each of rooms 801.

A detection signal from each of the room thermostats 814 is input in a heat load measuring means 818 so that the value of heat loads of the rooms is measured. An output from the heat load measuring means 818 is input in a damper control means 819 to control the degree of opening of each of the dampers 809. Detection signals from the pressure detector 816 and the temperature detector 815 are input in an operating condition measuring means 820. The operating condition measurmeans 820 operates in such a manner that the current pressure and temperature in the air duct. 806 are measured in accordance with the detection signal; the values of the pressure and the temperature are brought to the greatest values until the value of the greatest heat load among the heat loads in the rooms which are air-conditioned becomes zero or a predetermined value, just after initiation of the operation of the air conditioning apparatus and the values of the pressure; and temperature are brought to each established value for normal operation when the operation of the air conditioning apparatus becomes normal.

Outputs from the operating condition measuring means 820 are respectively input in an air blowing quantity determining means 821 and a capacity determining means 823 to determine the value of the quantity of air to be supplied from the air blower 805 and the capacity of the heat source apparatus 817. The capacity of the air blower 805 is controlled by an air blower control means 822 on the basis of an output from the air blowing quantity determining means 821, and the capacity of the heat source apparatus 817 is controlled by a heat source apparatus control means 824 on the basis of an output from the capacity control means 823.

Figure 27:
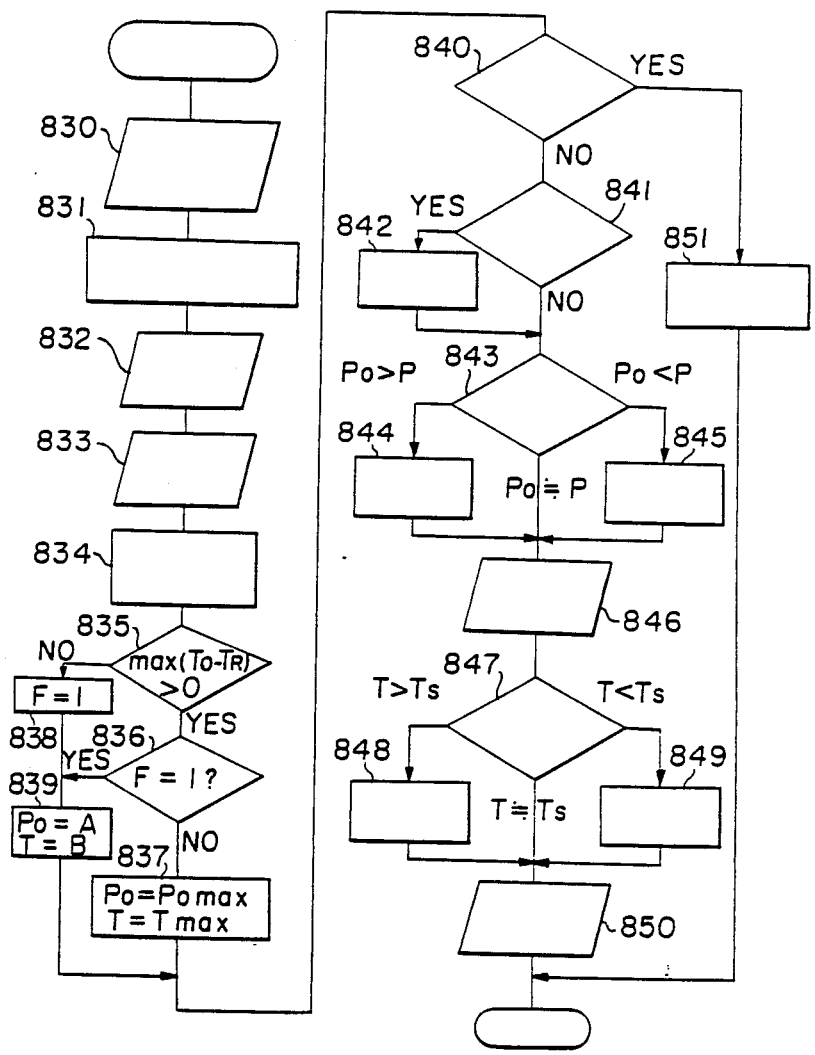
FIG. 27 is a flow chart for explaining the controlled operations of the eighth embodiment.

The operation for room-warming of the eighth embodiment will be described with reference to FIG. 27 showing the flow chart of a control program.

Explanation of controlling the air conditioning apparatus by a microcomputer and the circuit thereof is omitted. Explanation of controlling the degree of opening of the dampers 809 to regulate the quantity of air in conformity with the heat load is also omitted.

When the air conditioning apparatus is switched to room-warming mode, the control program as shown in FIG. 27 is started.

At Step 830, the values of an established temperature $T_o$ and the current room temperature $T_R$ are input to the heat load measuring means 818 from the room thermostat 814 in each of the rooms 801. At Step 831, determination of the degree of opening of each of the dampers 809 is carried out. In this case, if the room temperature is equal to the established temperature, change of the degree of opening of the dampers is not made. If the room temperature is lower than the established temperature, the dampers 809 is moved in the opening direction. If the room temperature is high, they are moved in the closing direction (Step 832).

At Step 833, the value of the pressure P in the air duct 806 after the dampers 809 are controlled is detected by the pressure detector 816, and at the same time, the value of the temperature of the air $T_s$ is detected by the temperature detector 815.

At Step 834, the greatest value of the heat load is found by using the values $T_o$ and $T_R$ which have been detected at Step 830 (the greatest value being found from the heat load of each of the rooms except for the room(s) which is not air-conditioned). In this case, there is a definition of heat load=established room temperature actual room temperature.

At Step 825, determination is made as to whether the value of the greatest heat load is higher than the value of 0 deg (or a predetermined value higher than 0 deg). If the greatest heat load is high, determination is made as to whether a flag F is 1 at Step 836. If the flag F not 1, the established pressure $P_o$ is established to be the established maximum pressure $P_{o\ max}$ and the temperature is established to be $T_{max}$ respectively at Step 837. At Step 835, the result of determination is "NO", the operational sequence goes to Step 838 at which the flag is established to be 1, and Step 839 is taken. At Step 839, the established pressure is established to be a predetermined value A and the established temperature to be a predetermined value B. Otherwise, when the result of the determination is "YES", then Step 839 is taken.

At Step 840, determination is made as to whether each of the dampers is entirely closed or it is in a nearly closed state which exceeds the limit of operation of the air conditioning apparatus. If they are not entirely closed, determination is made as to whether the heat source apparatus 817 is operated at Step 841. If the heat source apparatus is not operated, the operational sequence goes to Step 843. If the heat source apparatus is stopped, the heat source apparatus 817 and the air blower 805 are operated (Step 842), and the operational sequence follows by Step 843.

At Step 843, the value of the pressure P is compared with the value of the established pressure $P_o$. If $P_o > P$, the capacity (revolution) of the air blower 805 is increased depending on the difference between P and $P_o$ (Step 844). If $P < P_o$, the capacity of the air blower 805 is decreased (Step 845). If the pressure P is within a non-sensitive region of $P_o$, change of the revolution is not carried out, and the operational sequence goes to Step 846 at which the revolution of the air blower 805 is controlled by a controller such as a thyristor.

At Step 847, the value of the established temperature is compared with the value of the temperature $T_s$. If $T > T_s$, the capacity of the heat source apparatus 817 (the revolution of a compressor when a heat pump is used as the heat source apparatus 817) is increased depending on the difference between T and $T_s$ (Step 848). If $T < T_s$, the capacity of the heat source apparatus is decreased (Step 849). If the established temperature T is within a non-sensitive region of $T_s$, change of the revolution is not carried out, and the operational sequence goes to Step 850 at which the revolution of the heat source apparats 817 is controlled by a controller such as an inverter.

When the situation that all the dampers 809 are entirely closed is found at Step 840, the air blower 805 and the heat source apparatus 817 are stopped at Step 850.

The sequence of the control as above-mentioned is repeated at a fixed time interval. During a series of controlling operation, when the room temperature of a specified room or a plurality of rooms is lower than the established temperature just after the initiation of room-warming operation, the values of the established pressure and the established temperature are brought to the greatest values. Since the degree of opening of the dampers 809 is in proportion to the value of the heat load, the damper 809 for the room 801 having the greatest heat load becomes entirely opened condition. As a result, a large quantity of air having a high temperature is supplied to the room having the greatest heat load to increase the room temperature rapidly.

On the other hand, the damper for the room in which the room temperature is kept in satisfactory condition is throttled, whereby an optimum amount of warm air is supplied to the room. When the room temperature of each of the rooms reaches the established room temperature, and the value of the greatest heat load becomes small, the values of the established pressure and the established temperature are rendered to be normal values.

In the eighth embodiment, both values of the pressure and temperature of the air are brought to the greatest value to increase the capacity of room-warming operation just after initiation of the operation. However, it is possible that either one is brought to the greatest value in consideration of prevention of noise, efficiency of the heat source apparatus 817 and so on. Further, in order to bring each capacity of the air blower 805 and the heat source apparatus 817 to be the greatest value, the pressure and the temperature are established to be the greatest value in design. However, an air blower or a compressor may be operated (at the highest revolution or the highest operational frequency) which is permissible in design.

In the eighth embodiment, the greatest heat load is obtained by the difference between the established room temperature and the actual room temperature. However, since the value of the greatest heat load is related to the degree of opening of the dampers 809, the established values of the pressure and temperature may be changed depending on the degree of opening of the dampers. Namely, operation is carried out at the greatest value if there is any one of the dampers 809 having the degree of opening of 100% (the value of the degree may be more than 80% or other desirable values).

In the above-mentioned embodiment, although control of the apparatus is carried out under the condition that the established values of the pressure and temperature of the air in the normal operation are made constant (a constant A or B), a variable static pressure controlling method or a variable flowing air temperature control method may be employed during the normal operation.

The greatest heat load may be obtained by measuring temperature for each controlling operation, by measuring temperature at a time interval, or measuring temperature as a summed value or a means value in a certain time.

Figure 26:
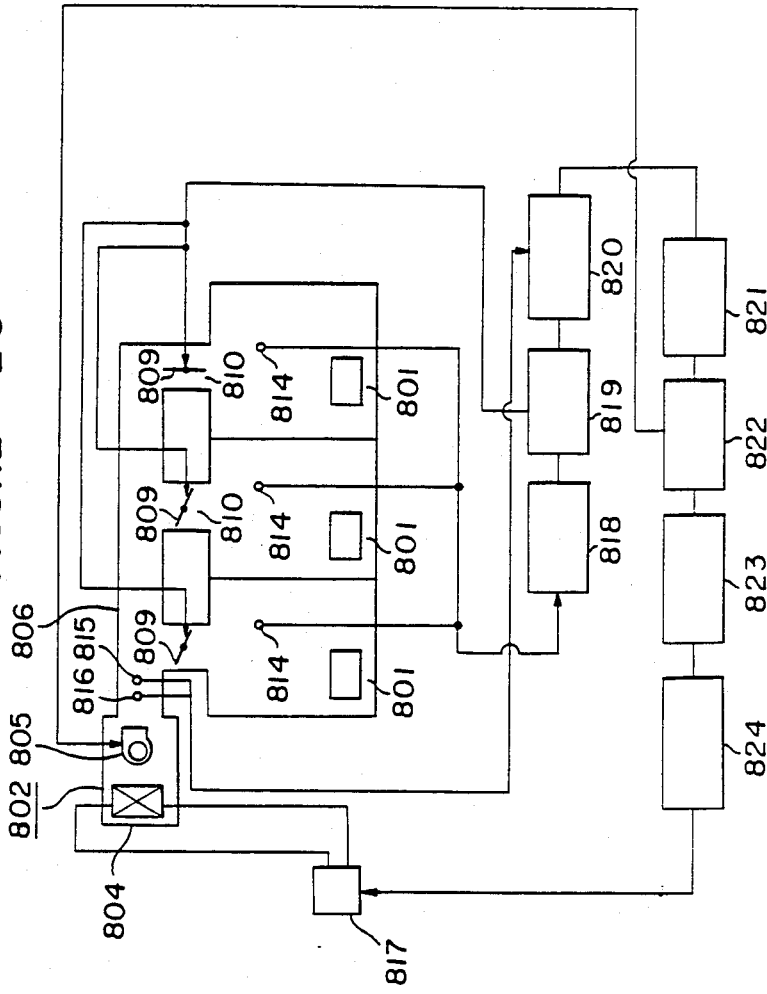
FIG. 26 is a diagram showing the construction of a eighth embodiment of the present invention.

The eighth embodiment has the construction that the structural elements in series from the operating condition measuring means 820 to the heat source apparatus control means 824 as shown in FIG. 26 execute the operations in this order. However, they may be arranged in the order of the operating condition measuring means 820, the air blowing quantity determining means 821, the capacity determining means 823, the air blower control means 822 and the heat source apparatus control means 824 since the time of execution of operation for each of the means is short.

In the above-mentioned embodiment, through description has been made in such a manner that the revolution of the air blower 805 is controlled by the thyristor and the revolution of the heat source apparatus 817 is controlled by the inverter, they may be controlled by other means.

The eighth embodiment uses a separate type heat pump as the heat source apparatus 817. However, another heat source apparatus such as an integral type heat pump, a gas furnace, a fan coil unit may be used.

In accordance with the eighth embodiment of the present invention, the values of the pressure and temperature of the air to be supplied are established to be the greatest values until the value of the greatest heat load becomes zero just after initiation of the operation of the air conditioning apparatus. Accordingly, the room temperature of each of the rooms is raised to the established temperature for a relatively short time even when the value of the heat load is large.

In the following, a ninth embodiment of the air conditioning apparatus according to the present invention will be described with reference to FIGS. 28 and 29.

Figure 28:
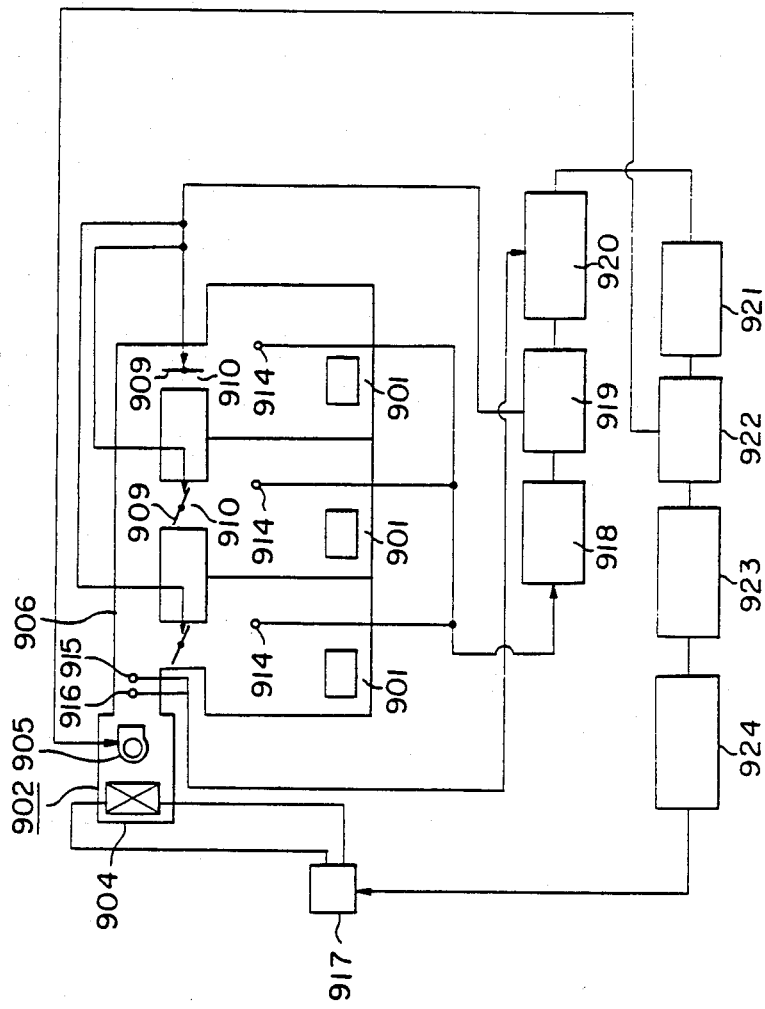
FIG. 28 is a diagram showing the construction of a ninth embodiment of the present invention.

In FIG. 28, the air conditioning apparatus comprises a capacity changeable type heat source apparatus 917 for producing warm air or cool air, which is connected to a heat exchanger 904 placed in a room unit 902, a capacity changeable type air blower 905 for feeding the warm air or cool air through the heat exchanger 904 connected to the heat source apparatus 917, an air duct 906 connected to the outlet port of the air blower 905, a blowing air regulating damper 909 disposed in each of branch ducts connected to the air duct 906, a pressure detector 916 disposed in the air duct 906 to detect the pressure of the air, a temperature detector 95 disposed in the air duct 906 to detect the temperature of the air and a room thermostat 914 attached to each of the rooms.

A detection signal from each of the room thermostats 914 is input in a heat load measuring means 918, whereby the value of a heat load in each of the rooms is measured. A damper control means 909 receives an output from the heat load measuring means 918 to control the degree of opening of the dampers 909. Detection signals from the pressure detector 916 and the temperature detector 915 are input in an operating condition measuring means 920. The operating condition measuring means 920 measures the values of the current pressure and temperature in the air duct 906 on the basis of the detection signals; brings the values of the pressure and the temperature to be the greatest values until the sum of the heat loads of the rooms which are air-conditioned becomes zero or a predetermined value just after initiation of the operation of the air conditioning apparatus; and brings the values of the pressure and temperature to be an established values when the air conditioning apparatus is in normal operation.

Outputs from the operating condition measuring means 920 are respectively supplied to an air blowing quantity determining means 921 and a capacity determining means 923 so that the quantity of air to be supplied from the air blower 905 and the capacity of the heat source apparatus 917 are determined. An air blower control means 922 controls the capacity of the air blower 905 on the basis of the output of the air blowing quantity determining means 921, and a heat source control means 924 controls the capacity of the heat source apparatus 917 on the basis of the capacity determining means 923.

Figure 29:
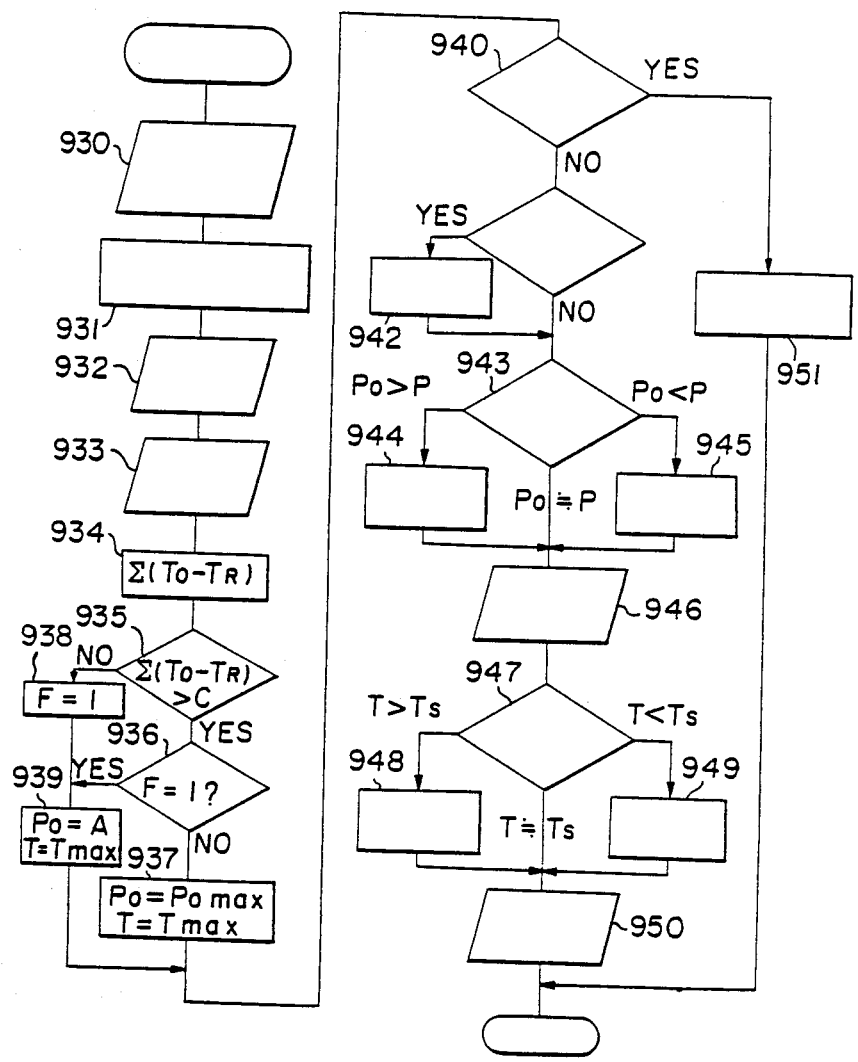
FIG. 29 is a flow chart for explaining the controlled operations of the ninth embodiment.

The operation for room-warming of the ninth embodiment will be described with reference to FIG. 29 showing the flow chart of a control program.

Although the control program is realized by using a microcomputer, explanation of the detail of the circuit of the microcomputer is omitted. Explanation of controlling the degree of opening of the dampers 909 for regulating the quantity of the air in conformity with heat loads is also omitted.

When the air conditioning apparatus is switched to room-warming operation mode, the control program as shown in FIG. 29 is started.

At Step 930, the values of an established temperature $T_o$ and the current room temperature $T_R$ are input in the heat load measuring means 918 from the room thermostat 914 placed in each of the rooms 901. Then, the degree of opening of each of the dampers is determined at Step 931. In this case, if the room temperature is equal to the established temperature, change of the degree of opening of the dampers 909 is not carried out. If the room temperature $T_R$ is low, the dampers 909 are moved in the opening direction. If the room temperature $T_R$ is high, the dampers 909 is moved in the closing direction (Step 932).

At Step 933, the pressure P in the air duct 906 after the dampers 909 are controlled is detected by the pressure detector 916( and the temperature $T_s$ of the air in the air duct 906 is detected by the temperature detector 915.

At Step 934, the sum of the heat loads of the rooms 901 is found by using the values of $T_o$ and $T_R$ which are detected at Step 930. In this case, the room(s) in which room-warming operation is stopped by the switch of the room thermostat 914 is not considered and there is a definition of heat load=established room temperature−actual room temperature.

At Step 935, determination is made as to whether the sum of the heat loads is higher than a predetermined value C (a constant, and the value C may be 0 deg). If the summed value is higher than the value C, determination is made as to a flag F is 1 at Step 936. If the flag F is not 1, the established pressure $P_o$ is established to be the established maximum pressure $P_{o\ max}$) and the established temperature T is established to be the established maximum temperature $T_{max}$ (Step 937).

At Step 935, the determination of "NO" is given, the operational sequence goes to Step 938 at which the flag F is established 1.

At Step 939, the established pressure is brought to a predetermined established value A and the established temperature is brought to a previously determined established value B respectively.

If the determination of "YES" is given at Step 936, Step 939 is taken.

At Step 940, determination is made as to whether all the dampers 909 are entirely closed or they are in a nearly closed state which exceeds the limit of operation of the air conditioning apparatus. If they are not entirely closed, determination is made as to whether the heat source apparatus 917 is operated at Step 941. If the heat source apparatus 917 is operated, Step 942 is taken. If it is stopped, the heat source apparatus 917 and the air blower 905 are operated (Step 942). At the next Step 943, the value of the pressure P is compared with the established pressure $P_o$. If $P_o > P$, the capacity of the air blower 905 is increased depending on the difference between P and $P_o$ (Step 944). If $P < P_o$, the capacity of the air blower 905 is decreased (Step 945). If the value of P is within a non-sensitive region of $P_o$, change of the revolution of the air blower 905 is not carried out, and the operational sequence goes to Step 946 at which the revolution of the air blower 905 is controlled by a controller such as a thyristor.

At Step 947, the value of the established temperature T is compared with the temperature $T_s$. If $T > T_s$, the capacity of the heat source apparatus 917 (the revolution of a compressor when a heat pump is used as the heat source apparatus 7) is increased depending on the difference between T and $T_s$ (Step 948). If $T < T_s$, the capacity is decreased (Step 949). If the value of T is within a non-sensitive region of $T_s$, the revolution of the heat source apparatus is not changed, and the operational sequence goes to Step 950 at which the revolution of the heat source apparatus 917 is controlled by a controller such as an inverter.

At Step 950, when determination is given such that all the dampers 909 are entirely closed, the air blower 905 and the heat source apparatus 917 are stopped at Step 951.

The control as above-mentioned is repeated at a fixed time interval. During the controlling operation, when the room temperature of a specified room or a plurality of rooms is lower than the established room temperature just after the initiation of the operation of the air conditioning apparatus, the values of the established pressure and the established temperature are determined to be the greatest values, and the damper 909 of the room 901 having a large heat load are in the entirely opened state since the degree of opening of the damper 909 is in proportion to the value of the heat load. As a result, a large quantity of air having a high temperature is supplied to the room 101 having a large heat load thereby to increase the room temperature rapidly.

Oh the other hand, the damper 909 of the room 901 in which the room temperature is in satisfactory condition is throttled, whereby an optimum quantity of warm air is supplied to the room.

When the room temperature of each of the rooms 901 reaches the established room temperature and the value of the summed heat load becomes small, the value of the established pressure and established temperature are returned to an established normal value.

In the above-mentioned embodiment, both values of the pressure and temperature of the air are established to be the greatest values to increase the capacity of the air blower and the heat source apparatus just after initiation of the operation of the air conditioning apparatus. However, either one of the pressure and temperature may be established to be the greatest value in consideration of prevention of noise, efficiency of the heat source apparatus 917 and so on.

In the embodiment, the values of the pressure and the temperature of the air are established at the greatest value in design in order to make the capacity of the air blower 905 and the heat source apparatus 917 the greatest. However, it is possible that the air blower 905 or the compressor may be operated at a highest revolution or the highest operational frequency which is permissible in-the machine.

In the embodiment, although the summed heat load is found by the value of the difference between the established room temperature and the actual room. temperature, the established values of the pressure and the temperature of the air may be changed in accordance with the degree of opening of the dampers 909 since these values are related to the degree of opening of the dampers 909. Namely, the air blower and the heat source apparatus may be operated at the greatest revolution until the sum of the degree of opening of the dampers 909 is lower than a predetermined value.

In the ninth embodiment, control of the air blower and the heat source apparatus is carried out in such a manner that the established values of the pressure and the temperature of the air are made a constant (a constant A and a constant B) in the normal operation. However, a variable static pressure control method or a variable air temperature control method may used in the normal operation. The summed heat load may be obtained by measuring temperature for each controlling operation, by measuring temperature at a predetermined time interval, or by measuring temperature as a summed or a means value in a time period.

In the above-mentioned embodiment, the structural elements from the operating condition measuring means 920 to the heat source apparatus control means 924 are arranged as shown in FIG. 29. However, they may be arranged in the order of the operating condition measuring means 920, the air blowing quantity determining means 921, the capacity determining means 923, the air blower control means 922 and the heat source apparatus control means 924 since the operation time executed by each of the elements is short.

The capacity of the air blower 905 and the capacity of the heat source apparatus 917 may be controlled by other control means instead of the thyristor and the inverter.

As the heat source apparatus 917, a separate type heat pump is used. However, another heat source apparatus such as an integral type heat pump, a gas furnace, a fan coil unit may be used.

As described above, in accordance with the ninth embodiment of the present invention, the values of the pressure and the temperature of the air at the time just after initiation of the operation of the air conditioning apparatus are determined to be greatest values until the value of the summed-heat load becomes lower than a predetermined value. Accordingly, the room temperature of each of the rooms can be increased to the established room temperature for a relatively short time even when the heat load is large.

We claim:

1. An air conditioning apparatus comprising a heat source apparatus for producing warm air or cool air, an air blower and an air duct for distributing the warm air or the cool air from said heat source apparatus to each of rooms, air quantity adjusting dampers, each being disposed in a branched duct connected to said air duct for each room, and a room thermostat disposed in each of said rooms, comprising:

a heat load measuring means which receives signals corresponding to an established room temperature determined by said room thermostat and an actual room temperature detected by said room thermostat, and measures a heat load for each of said rooms based on the difference between the established temperature and the detected temperature, a damper control means for controlling the degree of opening of said dampers on the basis of an output of said heat load measuring means, at least one of an established temperature determining means for determining the value of the established temperature for the air passing in said air duct and an established pressure determining means for determining the value of the established pressure for the air in said air duct based on the value of the heat load of each of said rooms measured by said heat load measuring means, wherein at least one of said air blower and said heat source apparatus is controlled by using an output from said established pressure determining means, wherein said heat source apparatus is of a capacity changeable type, said air blower is adapted to feed the air heated or cooled by said heat source apparatus at a substantially constant pressure, and said established temperature determining means is adapted to determine the value of an established temperature for the air in said air duct based on the greatest value among the heat loads in each of said rooms measured by said heat load measuring means, and which further comprises a temperature measuring means which receives and processes a detection signal from a temperature detector disposed in said air duct, a capacity determining means for determining the capacity of said heat source apparatus based on an output from said temperature detector and an output from said established temperature determining means, and a capacity control means for controlling said heat source apparatus based on an output from said capacity determining means, wherein said established temperature determining means comprise means to determine the value of an established temperature in said air duct to be at a limit value of the lower limit temperature for room-warming operation and the upper limit temperature for a room-cooling operation, which allows the operation of said heat source apparatus when the greatest value for heat load is not greater than zero; to determine said value to be a limit value at the upper limit temperature for room-warming operation and the lower limit temperature for room-cooling operation when the greatest value for heat load is the same as or higher than the established value; and to determine said value to be a temperature in proportion to the greatest value for heat load when the greatest value is in the range from zero to said established value.

2. The air conditioning apparatus according to claim 1, wherein said capacity control means is adapted to determine so that the capacity of said heat source apparatus is increased depending on the difference between said established temperature determined by said established temperature determining means and the temperature detected by said temperature detector.

3. The air conditioning apparatus according to claim 1, wherein said capacity control means regulates the revolution of a compressor when a heat pump is used as said heat source apparatus.

4. An air conditioning apparatus comprising a heat source apparatus for producing warm air or cool air, an air blower and an air duct for distributing the warm air or the cool air from said heat source apparats to each of rooms, air quantity adjusting dampers, each being disposed in a branched duct connected to said air duct for each room, and a room thermostat disposed in each of said rooms, comprising:

a heat load measuring means which receives signals corresponding to an established room temperature determined by said room thermostat and an actual room temperature detected by said room thermostat, and measures a heat load for each of said rooms based on the difference between the established temperature and the detected temperature, a damper control means for controlling the degree of opening of said dampers on the basis of an output of said heat load measuring means, at least one of an established temperature determining means for determining the value of the established temperature for the air passing in said air duct and an established pressure determining means for determining the value of the established pressure for the air in said air duct, based on the value of the heat load or each of said rooms measured by said heat load measuring means, wherein at least one of said air blower and said heat source apparatus is controlled by using an output from said established pressure determining means, wherein said heat source apparatus is of a capacity changeable type, said air blower is adapted to feed the air heated or cooled by said heat source apparatus at a substantially constant pressure, and said established temperature determining means is adapted to determine the value of an established temperature for the air in said air duct based on outputs form said damper control means and said heat load measuring means, and which further comprises a temperature measuring means for receiving and processing an output form said established temperature determining means and a detection signal from a temperature detector disposed in said air duct, a capacity determining means for determining the capacity of said heat source apparatus based on an output from said temperature measuring means, and a heat source apparatus controlling means for controlling the capacity of said heat source apparatus based on an output from said capacity determining means, wherein said established temperature determining means changes said established temperature so as to increase the capacity of said heat source apparatus when the room temperature of any one of said rooms does not reach said reestablished temperature after the lapse of a certain time when said dampers are entirely opened, and changes said established temperature so as to decrease the capacity of said heat source apparatus when there are no entirely opened damper after the lapse of a certain time.

5. An air conditioning apparatus comprising a heat source apparatus for producing warm air or cool air, an air blower and an air duct for distributing the warm air or the cool air from said heat source apparatus to each of rooms, air quantity adjusting dampers, each being disposed in a branched duct connected to said air duct for each room, and a room thermostat disposed in each of said rooms, comprising:

a heat load measuring means which receives signals corresponding to an established room temperature determined by said room thermostat and an actual room temperature detected by said room thermostat, and measures a heat load for each of said room based on the difference between the established temperature and the detected temperature, a damper control means for controlling the degree of opening of said dampers on the basis of an output of said heat load measuring means, at least one of an established temperature determining means for determining the value of the established temperature for the air passing in said air duct and an established pressure determining means for determining the value of the established pressure for the air in said air duct, based on the value of the heat load of each of said rooms measured by said heat load measuring means, wherein at least one of said air blower and said heat source apparatus is controlled by using an output form said established pressure determining means, wherein said heat source wherein said heat source apparatus and said air blower are both a capacity changeable type, and said established pressure determining means is adapted to determine the value of an established pressure for the air in said air duct abused on the sum total of the heat load in each of said rooms measured by said heat load measuring means, and said established temperature determining means is adapted to determine the value of an established temperature for air in said air duct based on the sum total of said heat loads, and which comprises a pressure detector and a temperature detector disposed in said air duct, a pressure-temperature measuring means which receives and processes detection signals form said pressure detector and said temperature detector, an air blowing quantity determining means for determining the capacity of said air blower based on a pressure signal output from said pressure-temperature measuring means and an output form said established pressure determining means, a blower control means for controlling said air blower based on an output from said air blowing quantity determining means, a capacity determining means for determining the capacity of said heat source apparatus bawed on an output from said established temperature determining means and a temperature signal output from said established temperature determining means and a temperature signal output from said pressure-temperature measuring means, and as heat source apparatus controlling means for controlling the capacity of said heat source apparatus based on an output from said capacity determining means.

6. An air conditioning apparatus comprising a heat source apparatus for producing warm air or cool air, an air blower and an air duct for distributing the warm air or the cool air from said heat source apparatus to each of rooms, air quantity adjusting dampers, each being disposed in a branched duct connected to said air duct for each room, and a room thermostat disposed in each of said rooms, comprising:

a heat load measuring means which receives signals corresponding to an established room temperature determined by said room thermostat and an actual room temperature detected by said room thermostat, and measures a heat load for each of said rooms based on the difference between the established temperature and the detected temperature, a damper control means for controlling the degree of opening of said dampers on the basis of an output of said heat load measuring means, at least one of an established temperature determining means for determining the value of the established temperature for the air passing in said air duct and an established pressure determining means for determining the value of the established pressure for the air in said air duct, based on the value of the heat load of each of said rooms measured by said heat load measuring means, wherein at least one of said air blower and said heat source apparatus is controlled by using an output form said established pressure determining means, wherein said heat source apparatus is adapted to produce warm air or cool air at substantially constant temperature, said air blower is of a capacity changeable type, and said established pressure determining means is adapted to determine the value of an established pressure for the air in said air duct based on the sum total of said heat load in each of said rooms measured by said heat load measuring means, and which further comprises a pressure detector disposed in said air duct, a pressure measuring means which receives and processes a detection signal from said pressure detector, an air blowing quantity determining means for determining the capacity of said air blower based on an output from said pressure measuring means and an output form said established pressure determining means, and a blower control means for controlling said air blower based on an output from said air blowing quantity determining means.

7. An air conditioning apparatus comprising a capacity changeable type heat source apparatus for producing warm air or cool air, a capacity changeable type air blower and an air duct for distributing the warm air or the cool air from said heat source apparatus to each of rooms, air quantity adjusting dampers, each being disposed in a branched duct connected to said air duct for each room, and a room thermostat disposed in each of said rooms, which is characterized by comprising:

- a heat load measuring means which receives signals corresponding to an established room temperature determined by said room thermostat and an actual room temperature detected by said room thermostat, and measures a heat load for each of said rooms based the difference between the established temperature and the detected temperature,
- a damper control means for controlling the degree of opening of said dampers on the basis of an output of said heat load measuring means,
- an operating condition measuring means which receives and processes an output from said damper control means and detection outputs from a pressure detector and a temperature detector disposed in said air duct in such a manner that in a period just after initiation of room-warming or room-cooling operation caused by starting a compressor, at least one between the pressure of the air forcibly fed by said air blower in said air duct and the temperature of the air heated by said heat source apparatus is determined to be brought to the maximum value (the minimum value for room-cooling operation) until the value of a heat load in each of said rooms measured by said heat load measuring means reaches an established value, and when said heat load reaches said established value and said room-warming (room-cooling) operation is under normal condition, said value of pressure of the air and said value of temperature of the air are determined to be brought to values for the normal operation,
- an air blowing quantity determining means for determining the capacity of said air blower based on an output from said operating condition measuring means,
- a blower control means for controlling said air blower based on an output from said air blowing quantity determining means,
- a capacity determining means for determining the capacity of said heat source apparatus based on an output from said operating condition measuring means, and
- a heat source apparatus controlling means for controlling the capacity of said heat source apparatus based on an output from said capacity determining means.

8. The air conditioning apparatus according to claim 7, wherein said air blowing quantity determining means is adapted to bring the pressure of the air fed by said air blower to the maximum value in a period just after initiation of room-warming operation; to bring the pressure of the air to an established value for carrying out the normal operation, and to determine the capacity of said air blower based on said established value and an output from said operating condition measuring means which in turn receives a detection signal from said pressure detector.

9. The air conditioning apparatus according to claim 7, wherein said capacity determining means is adapted to bring the temperature of the air fed by said air blower to the maximum value in a period just after initiation of room-warming operation (or to the minimum value in a period just after initiation of room-cooling operation); to bring the temperature of the air to an established value for carrying out the normal operation, and to determine the capacity of said heat source apparatus based on said predetermined value and an output from said operating condition measuring means which in turn receives an output from said temperature detector.

10. The air conditioning apparatus according to claim 7, wherein said operating condition measuring means continues the maximum value operation until the maximum value in the heat loads of the rooms or the sum total of the heat loads reaches zero or a predetermined value.

* * * * *